US012140974B1

(12) United States Patent
Tan et al.

(10) Patent No.: US 12,140,974 B1
(45) Date of Patent: Nov. 12, 2024

(54) METHOD FOR STOCHASTIC INSPECTIONS ON POWER GRID LINES BASED ON UNMANNED AERIAL VEHICLE-ASSISTED EDGE COMPUTING

(71) Applicant: NANJING UNIVERSITY OF INFORMATION SCIENCE & TECHNOLOGY, Jiangsu (CN)

(72) Inventors: Ling Tan, Jiangsu (CN); Lei Sun, Jiangsu (CN); Jingming Xia, Jiangsu (CN)

(73) Assignee: NANJING UNIVERSITY OF INFORMATION SCIENCE & TECHNOLOGY, Jiangsu (CN)

( * ) Notice: Subject to any disclaimer, the term of this patent is extended or adjusted under 35 U.S.C. 154(b) by 0 days.

(21) Appl. No.: 18/270,865

(22) PCT Filed: Nov. 8, 2022

(86) PCT No.: PCT/CN2022/130532
§ 371 (c)(1),
(2) Date: Jul. 5, 2023

(87) PCT Pub. No.: WO2023/160012
PCT Pub. Date: Aug. 31, 2023

(30) Foreign Application Priority Data

Feb. 25, 2022 (CN) .......................... 202210174497.3

(51) Int. Cl.
*G05D 1/644* (2024.01)
*G05D 1/689* (2024.01)
(Continued)

(52) U.S. Cl.
CPC ............ *G05D 1/644* (2024.01); *G05D 1/689* (2024.01); *G05D 1/69* (2024.01); *H04N 7/181* (2013.01);
(Continued)

(58) Field of Classification Search
CPC .......... G05D 1/644; G05D 1/689; G05D 1/69; G05D 2109/254; G05D 2105/89; H04N 7/181
See application file for complete search history.

(56) References Cited

U.S. PATENT DOCUMENTS

2018/0129881 A1    5/2018  Seeber et al.
2018/0357788 A1*  12/2018  Li ............................. G06T 7/55
(Continued)

FOREIGN PATENT DOCUMENTS

| CN | 113296963 | 8/2021 |
| CN | 114065963 | 2/2022 |
| CN | 114237917 | 3/2022 |

OTHER PUBLICATIONS

"International Search Report (Form PCT/ISA/210) of PCT/CN2022/130532," mailed on Jan. 9, 2023, pp. 1-4.
(Continued)

*Primary Examiner* — Matthew J. Reda
(74) *Attorney, Agent, or Firm* — JCIPRNET

(57) ABSTRACT

The present disclosure relates to a method for stochastic inspections on power grid lines based on unmanned aerial vehicle-assisted edge computing. According to the method, a stochastic distributed inspection unmanned aerial vehicle is adopted to acquire video images on a target power grid area, which can reduce funds and time costs of inspections. With assistance of superior unmanned aerial vehicle, a goal is to minimize energy consumption of an unmanned aerial vehicle system and extend operation time of the unmanned aerial vehicles under same payload conditions, while processing video image data collected from the inspection unmanned aerial vehicles. The near-far effect generated by communications between mobile unmanned aerial vehicles is eliminated by introducing a NOMA, and position coordinates, system resource allocations and task offload deci- (Continued)

sion schemes are solved by using a method of combining a DDPG algorithm in a Deep reinforcement learning with a genetic algorithm.

11 Claims, 5 Drawing Sheets

(51) Int. Cl.
  *G05D 1/69* (2024.01)
  *H04N 7/18* (2006.01)
  *G05D 105/80* (2024.01)
  *G05D 109/25* (2024.01)

(52) U.S. Cl.
  CPC ... *G05D 2105/89* (2024.01); *G05D 2109/254* (2024.01)

(56) References Cited

U.S. PATENT DOCUMENTS

| | | | | |
|---|---|---|---|---|
| 2019/0143827 | A1* | 5/2019 | Jaugilas | B60L 53/12 |
| | | | | 320/109 |
| 2020/0410870 | A1* | 12/2020 | Zhang | G08G 5/0069 |
| 2023/0040707 | A1* | 2/2023 | Richards | G06T 7/73 |
| 2024/0002079 | A1* | 1/2024 | Zou | G05D 1/106 |

OTHER PUBLICATIONS

"Written Opinion of the International Searching Authority (Form PCT/ISA/237) of PCT/CN2022/130532," mailed on Jan. 9, 2023, pp. 1-8.

\* cited by examiner

METHOD FOR STOCHASTIC INSPECTIONS ON POWER GRID LINES BASED ON UNMANNED AERIAL VEHICLE-ASSISTED EDGE COMPUTING

CROSS-REFERENCE TO RELATED APPLICATION

This application is a 371 of international application of PCT application serial no. PCT/CN2022/130532, filed on Nov. 8, 2022, which claims priority to Chinese patent application NO. 2022101744973 filed on Feb. 25, 2022 and entitled "unmanned aerial vehicle-assisted EDGE COMPUTING METHOD for inspections on power grid lines", the disclosure of which is hereby incorporated by reference in its entirety.

TECHNICAL FIELD

The present disclosure relates to the technical field of mobile edge computing, and specifically relates to a method for stochastic inspections on power grid lines based on unmanned aerial vehicle-assisted edge computing.

RELATED ART

Electricity is an important basic guarantee for national economy and people's livelihood, and a reliability and a safety of power grids must be guaranteed. In a vicinity of thermal power plants and substations, distributions of transmission power lines are always very dense and complex, and inspections for lines appear particularly important. It is difficult to conduct inspections for power gird lines depends on manual methods in view of the power grid lines distributed under a harsh deployment environment. Based on an excellent sensitivity, low risks, and ease of deployments of unmanned aerial vehicles, unmanned aerial vehicles can serve as sensing nodes in wireless sensor networks and in charge of operations on data collections. On the other hand, developments of high-speed image acquisitions and sensor imaging technologies based on infrared and ultraviolet that are configured on unmanned aerial vehicles are relatively mature, which is capable of quickly completing the operations of the video image acquisition in power grid areas. Therefore, a method for unmanned aerial vehicle-assisted power grid lines inspection can be a cost-effective choice for power companies, and has a broad prospective.

Risks of high-voltage radiations exist in power gird lines areas, which is unfavorable to conduct manual inspections. An existing general method is that line inspections are conducted by adopting inspection robots suspended on transmission power lines, but a moving speed of the inspection robots is relatively slow, resulting in long inspection cycles and low inspection efficiencies. Fast and efficient inspections for the power grid lines can be implemented based on a method for stochastic inspections based on unmanned aerial vehicle assistance, which saves time and is economical. The present disclosure adopts a digital twin network to construct an unmanned aerial vehicle-assisted power grid lines stochastic inspection system. Non orthogonal multiple access (NOMA) is introduced into a scene of the power grid line inspections for the first time, solving the problems of near-far effect generated by communications among the mobile unmanned aerial vehicle groups during the power grid lines inspections. The near-far effect refers to that when a superior unmanned aerial vehicle receives signals from inspection unmanned aerial vehicles with two different distances, due to a stronger signal of a closer inspection unmanned aerial vehicle and a weaker signal of a farther inspection unmanned aerial vehicle, the stronger signal of the former can generate serious interference to the latter during moving processes of the unmanned aerial vehicles, and NOMA is introduced to eliminate the above-mentioned interference.

SUMMARY OF INVENTION

The technical problems need to be solved by the present disclosure are to provide a method for stochastic inspections on power grid lines based on unmanned aerial vehicle-assisted edge computing in view of the problems of a full coverage of the power grid lines and near-far effects of communications among a mobile unmanned aerial vehicle group during power grid line inspections, which adopts a new model and implements a minimization of balanced energy consumption of an unmanned aerial vehicle under a condition of completing inspection tasks for the power grid lines, thus extending operation time of the unmanned aerial vehicle.

In order to solve the above-mentioned technical solutions, the exemplary embodiments of the present disclosure adopts the following technical solutions. The present disclosure designs a method for stochastic inspections on power grid lines based on unmanned aerial vehicle-assisted edge computing, an inspection is conducted on a target power gird area including power grid equipment and power transmission lines by applying an unmanned aerial vehicle group including M inspection unmanned aerial vehicles and a superior unmanned aerial vehicle based on a central base station arranged on a fixed position, and the method includes the following steps.

In Step S1, based on a flight mode of each of the inspection unmanned aerial vehicles in the unmanned aerial vehicle group, an unmanned aerial vehicle-assisted power grid lines stochastic inspection system is constructed. The inspection unmanned aerial vehicles are merely in charge of acquiring video images for the power gird equipment and the power transmission lines in the target power gird area, and data are processed on obtained video images by the superior unmanned aerial vehicle or the central base station, and then Step S2 is entered.

In Step S2, based on the unmanned aerial vehicle-assisted power grid lines stochastic inspection system, the video images are acquired for the power gird equipment and the power transmission lines in the target power gird area by each of the inspection unmanned aerial vehicles in the unmanned aerial vehicle group, and the video image data acquired and obtained by each of the inspection unmanned aerial vehicles corresponding to each time slot respectively are obtained, and then Step S3 is entered.

In Step S3, according to the video image data acquired and obtained by each of the inspection unmanned aerial vehicles corresponding to each time slot respectively, in combination with a weight, a signal transmission power and position coordinates of each of the inspection unmanned aerial vehicles, a weight, a signal transmission power, position coordinates, and a computing capacity of the superior unmanned aerial vehicle, and position coordinates of the central base station, as well as a system communication bandwidth, a digital twin network of the unmanned aerial vehicle-assisted power grid lines stochastic inspection system is constructed, to fit the position coordinates of each of the inspection unmanned aerial vehicles and the superior unmanned aerial vehicle, and a resource status of the system, and then Step S4 is entered.

In Step S4, according to the digital twin network of the unmanned aerial vehicle-assisted power grid lines stochastic inspection system, based on constraints of an offload latency and a data task processing latency for the power grid lines stochastic inspection system, an energy consumption model or a balanced energy consumption model of the unmanned aerial vehicle group corresponding to the each time slot respectively is constructed, and an objective function for minimizing energy consumption of the unmanned aerial vehicle group corresponding to each time slot respectively or an objective function for minimizing balanced energy consumption of the unmanned aerial vehicle group corresponding to each time slot respectively is further constructed, and then Step S5 is entered.

In Step S5, the position coordinates of the superior unmanned aerial vehicle are randomly initialized, and based on the position coordinates and the video image data of each of the inspection unmanned aerial vehicles corresponding to the t-th time slot respectively, a system status at the t-th time slot is constructed, and then Step S6 is entered.

In Step S6, based on the position coordinates of the superior unmanned aerial vehicle and the system status at the t-th time slot, according to the objective function for minimizing energy consumption of the unmanned aerial vehicle group corresponding to the each time slot or the objective function for minimizing balanced energy consumption of the unmanned aerial vehicle group corresponding to each time slot respectively, the energy consumption model of the unmanned aerial vehicle group corresponding to each time slot respectively is solved by adopting a DDPG algorithm in a deep reinforcement learning. An action space of the system at the t-th time slot corresponding to the system status at the t-th time slot in combination with the position coordinates of the superior unmanned aerial vehicle, that is, the action space of the system at the t-th time slot corresponding to the system status at the t-th time slot in combination with the position coordinates of the superior unmanned aerial vehicle is obtained, and the action space of the system at the t-th time slot is composed of the signal transmission power of each of the inspection unmanned aerial vehicles corresponding to the t-th time slot respectively, an offload mode of each of the inspection unmanned aerial vehicles corresponding to the t-th time slot respectively regarding the superior unmanned aerial vehicle or the central base station, and the signal transmission power and an allocated CPU (central processing unit) calculation frequency of the superior unmanned aerial vehicle corresponding to the t-th time slot, and then Step S7 is entered.

In Step S7, whether an iteration overflow condition is satisfied or not is determined, if yes, Step S8 is entered, if no, based on the system status at the t-th time slot, in combination with system resource allocations and offload decision schemes for the video image data in the action space of the system at the t-th time slot corresponding to the position coordinates of the superior unmanned aerial vehicle, the position coordinates of the superior unmanned aerial vehicle is solved and updated by adopting a genetic algorithm, and Step S6 is returned.

In Step S8, according to the position coordinates of the superior unmanned aerial vehicle, and the system resource allocations and the offload decision schemes for the video image data in the action space of the corresponding system at the t-th time slot, the video image data acquired and obtained by each of the inspection unmanned aerial vehicles corresponding to each time slot in Step S2 are processed to offload the video image data to the superior unmanned aerial vehicle or the central base station for processing.

The method for stochastic inspections on power grid lines based on unmanned aerial vehicle-assisted edge computing provided by adopts the above technical solutions and has following technical effects in comparison with the prior art.

The present disclosure designs the unmanned aerial vehicle-assisted edge computing for the stochastic inspections on the power grid lines. In this method, the inspection unmanned aerial vehicles are adopted to acquire the video images on the target power gird area, with the help of the superior unmanned aerial vehicle to assist in processing the video image data acquired by the inspection unmanned aerial vehicle, aiming at minimizing an energy consumption of an unmanned aerial vehicle system, and by using a method of combining a DDPG (deep deterministic policy gradient) algorithm in a deep reinforcement learning with a genetic algorithm, position coordinates, system resource allocations and task offload decision schemes are solved, ensuring that the unmanned aerial vehicle system can implement power grid lines inspections under a premise of a minimizing energy consumption. In consideration of a harsh environment of a power grid inspection area, unmanned aerial vehicles are designed to acquire the video images on the target power grid area, and the inspection costs are reduced by a mode of stochastic inspections. Considering the near-far effect generated by communications among mobile unmanned aerial vehicles in high-speed, a NOMA is introduced to the present disclosure for eliminating this disadvantage. Meanwhile, aiming at optimizing the energy consumption of the unmanned aerial vehicle system, operation time of the unmanned aerial vehicle under the same energy carrying conditions is extended. Besides, a method of combining the DDPG algorithm with the genetic algorithm is adopted to solve the position coordinates, the system resource allocations and the task offload decision schemes, which has a fast iteration speed and a low time complexity, and can improve a real time performance of the system. Finally, the inspection costs are further saved by the stochastic inspection mode.

DESCRIPTION OF EMBODIMENTS

Figure 1:
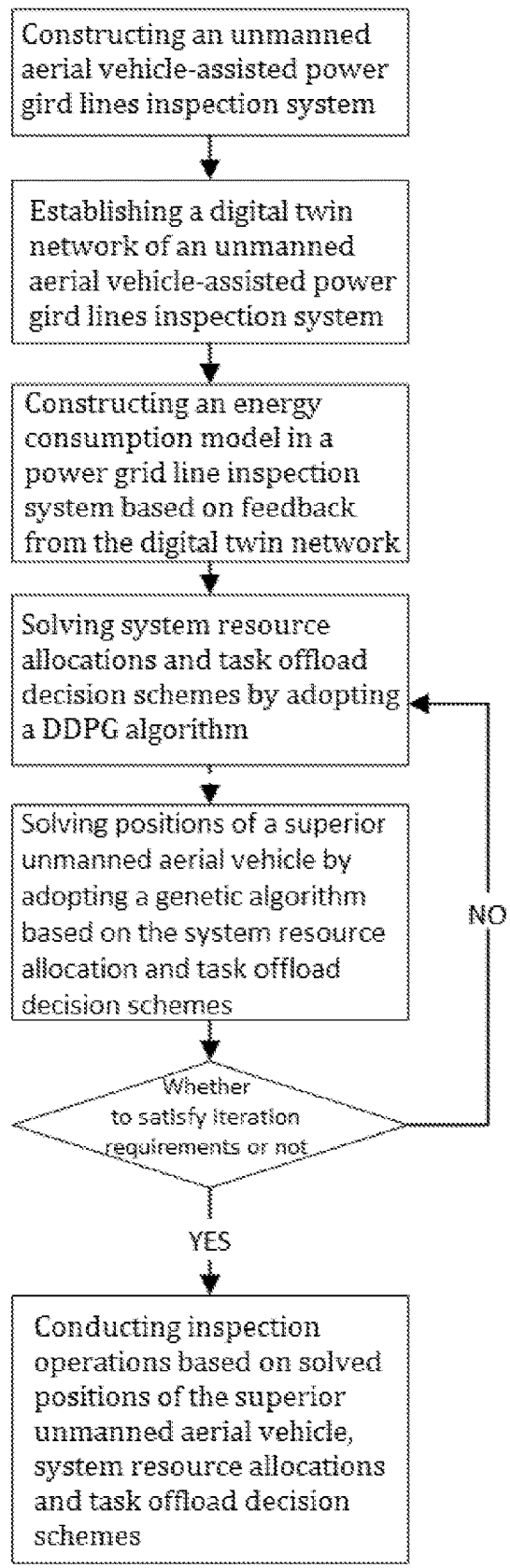
FIG. 1 illustrates an implement flow chart of a method for unmanned aerial vehicle-assisted stochastic inspections to power gird lines integrated with a mobile edge computing designed in one embodiment of the present disclosure.

In order to further reduce the inspection costs, an unmanned aerial vehicle-assisted edge computing method for stochastic inspections on power grid lines is provided by the present disclosure. Considering a limited carrying capacity of the unmanned aerial vehicles, the energy consumption of the unmanned aerial vehicles is reduced as much as possible with the help of utilizing the unmanned aerial vehicles to assist the power gird lines inspections, thereby extending the operation time of the unmanned aerial vehicles under the same energy consumption conditions, thus further enhancing continuous operating abilities of the unmanned aerial vehicles and improving the inspection efficiencies. Specifically, based on the information provided by the digital twin network, the objective of minimizing the balanced energy consumption of the unmanned aerial vehicle group is implemented through joint optimizations of computing resources, communication resources, unmanned aerial vehicle trajectories, and task offload decisions. Considering that latency requirements in inspection scenes are sensitive, couplings between variables is relatively high, and the digital twin network has time-varying properties (due to different positions of the unmanned aerial vehicles at different time slots), thus an algorithm combining a genetic algorithm with a reinforcement learning (GA-DDPG) is adopted to solve optimization problems of the above objectives. Based on trained strategies, the reinforcement learning can quickly provide action strategies, which is suitable for solving problems with the time-varying properties. Agents in the GA-DDPG reinforcement learning need to obtain comprehensive and accurate system status information, and the digital twin are embedded into the GA-DDPG algorithm in the present disclosure to construct a mapping between physical objects and virtual models, thus implementing the above objectives. The genetic algorithm in the GA-DDPG is used to reduce dimensions of decision spaces in the reinforcement learning algorithm and accelerate the training speed of the overall algorithm.

The exemplary embodiments are more comprehensively described in combination with the accompanying drawings now. However, the exemplary embodiments can be implemented in multiple forms and should not be understood as limited to the embodiments described herein. On the contrary, the embodiments provided herein enable the present disclosure to be more comprehensive and complete, and to fully convey concepts of the exemplary embodiments to a person skilled in the art. The same reference numbers in the drawings represent the same or similar parts, so repeated descriptions of them are omitted.

The described features, structures, or properties can be combined with one or more embodiments through any suitable modes. In the following description, many specific details are provided to lead to full understandings of the embodiments of the present disclosure. However, it can be realized by a person skilled in the art that the technical solutions of the present disclosure can be practiced without one or more among these specific details, or other methods, components, materials, devices, or operations can be employed. In these situations, it is not shown or described in detail of common structures, methods, devices, implementations, materials, or operations.

The flowcharts shown in the accompanying drawings are only the exemplary descriptions, which is not obliged to include all contents and operations or steps, and is not obliged to execute by the described order. For example, some operations or steps also can be decomposed, while some operations or steps can be merged or partially merged, thus the actual order of executions can be changed according to the actual situations.

The specific implements of the present disclosure are further described in detail in combination with the accompanying drawings of the specification.

Figure 2:
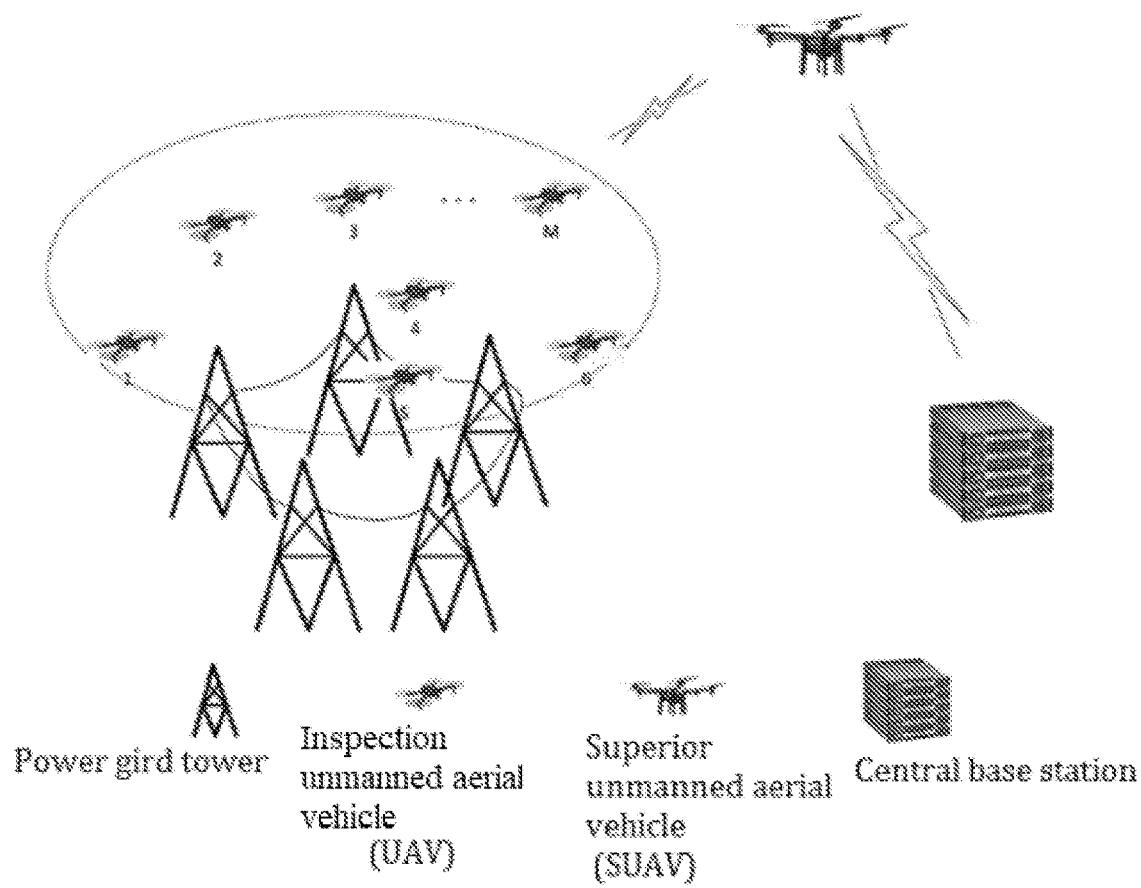
FIG. 2 illustrates a model diagram of an unmanned aerial vehicle-assisted power grid lines stochastic inspection system in an application implementation designed in one embodiment of the present disclosure.

Designed by the present disclosure is a method for stochastic inspections on power grid lines based on unmanned aerial vehicle-assisted edge computing, as illustrated in FIG. 2, based on a central base station arranged on a fixed position, by applying an unmanned aerial vehicle group including M inspection unmanned aerial vehicles (UAV) and a superior unmanned aerial vehicle (SUAV), an inspection is conducted on a target power gird area including power grid equipment and power transmission lines. Each of the inspection unmanned aerial vehicles is equipped with a high-speed image capture module. In one embodiment, as illustrated in FIG. 1, the following steps S1 to step S8 are specifically executed.

In Step S1, based on a flight mode of each of the inspection unmanned aerial vehicles in the unmanned aerial vehicle group, an unmanned aerial vehicle-assisted power grid lines stochastic inspection system is constructed. The inspection unmanned aerial vehicles are merely in charge of acquiring video images for the power gird equipment and the power transmission lines in the target power gird area, and data are processed on obtained video images by the superior unmanned aerial vehicle or the central base station, and then Step S2 is entered.

In one embodiment, the above-mentioned Step S1 is specifically executed in the following Step S11 to Step S13.

In Step S11, based on a constant motion status of each of the inspection unmanned aerial vehicles within each time slot, a moving speed $v_m(t)$, a horizontal moving direction $\alpha_m(t)$, and a vertical moving direction $\beta_m(t)$ of a m-th inspection unmanned aerial vehicle corresponding to the t-th time slot are obtained for each of the inspection unmanned aerial vehicles respectively according to following formulas:

$$v_m(t)=\lambda_1 v_m(t-1)+(1-\lambda_1)\bar{v}+\sqrt{1-\lambda_1^2}\phi_m$$

$$\alpha_m(t)=\lambda_2 \alpha_m(t-1)+(1-\lambda_2)\overline{\alpha_m}+\sqrt{1-\lambda_2^2}\psi_m$$

$$\beta_m(t)=\lambda_3 \beta_m(t-1)+(1-\lambda_3)\overline{\beta_m}+\sqrt{1-\lambda_3^2}\varphi_m,$$

where $1 \leq m \leq M$, $\bar{v}$ represents an average moving speed of all inspection unmanned aerial vehicles, $\overline{\alpha_m}$ represents an average horizontal moving angle of the m-th inspection unmanned aerial vehicle corresponding to previous t−1 time slot, $\overline{\beta_m}$ represents an average vertical moving angle of the m-th inspection unmanned aerial vehicle corresponding to the previous t−1 time slot, $v_m(t-1)$, $\alpha_m(t-1)$ and $\beta_m(t-1)$ sequentially represent a moving speed, a horizontal moving direction, and a vertical moving direction of the m-th inspection unmanned aerial vehicle corresponding to the previous t−1 time slot, $0<\lambda_1<1$, $\lambda_1$ represents a preset parameter used to adjust impacts of the moving speed of the inspection unmanned aerial vehicles corresponding to the previous t−1 time slot on a moving speed of the inspection unmanned aerial vehicles corresponding to the t-th time slot; $0<\lambda_2<1$, $\lambda_2$ represents a preset parameter used to adjust impacts of the horizontal moving direction of the inspection unmanned aerial vehicles corresponding to the previous t−1 time slot on a horizontal moving direction of the inspection unmanned aerial vehicles corresponding to the t-th time slot; $0<\lambda_3<1$, $\lambda_3$ represents a preset parameter used to adjust impacts of the vertical moving direction of the inspection unmanned aerial vehicles corresponding to the previous t−1 time slot on a vertical moving direction of the inspection unmanned aerial vehicles corresponding to the t-th time slot; a preset parameter $\phi_m$ that follows an independent gaussian distribution represents a randomness of the moving speed of the m-th inspection unmanned aerial vehicle, a preset parameter $\psi_m$ that follows an independent gaussian distribution represents a randomness of the horizontal moving direction of the m-th inspection unmanned aerial vehicle, and a preset parameter $\varphi_m$ that follows an independent gaussian distribution represents a randomness of the vertical moving direction of the m-th inspection unmanned aerial vehicle, and then entering Step S12.

In Step S12, according to a length $\tau$ of each time slot, the position coordinates $L_m^{UAV}(t)=(x_m(t),y_m(t),h_k(t))$ of the m-th inspection unmanned aerial vehicle corresponding to the t-th time slot are obtained, for each of the inspection unmanned aerial vehicles respectively according to following formulas:

$$x_m(t)=x_m(t-1)+v_m(t-1)\cos(\alpha_m(t-1))\tau$$

$$y_m(t)=y_m(t-1)+v_m(t-1)\sin(\alpha_m(t-1))\tau$$

$$h_m(t)=h_m(t-1)+v_m(t-1)\sin(\beta_m(t-1))\tau$$

where $x_m(t)$, $y_m(t)$, $h_m(t)$ represent the values for the m-th inspection unmanned aerial vehicle respectively on coordinate axes x, y, z corresponding to the t-th time slot, $x_m(t-1)$, $y_m(t-1)$, $h_m(t-1)$ represent values for the m-th inspection unmanned aerial vehicle respectively on coordinate axes x, y, z corresponding to the t−1-th time slot, and then Step S13 is entered.

In Step S13, according to the moving speed, the horizontal moving direction, the vertical moving direction and the position coordinates of each of the inspection unmanned aerial vehicles respectively corresponding to the t-th time slot, the unmanned aerial vehicle-assisted power grid lines stochastic inspection system is constructed. The inspection unmanned aerial vehicles are merely in charge of acquiring video images for the power gird equipment and the power transmission lines in the target power gird area, and the data are processed on the obtained video images by the superior unmanned aerial vehicle or the central base station, and then Step S2 is entered.

In Step S2, the video images are acquired for the power gird equipment and the power transmission lines in the target power gird area by each of the inspection unmanned aerial vehicles in the unmanned aerial vehicle group based on the unmanned aerial vehicle-assisted power grid lines stochastic inspection system, and the video image data acquired and obtained by the each of the inspection unmanned aerial vehicles corresponding to each time slot respectively are obtained, and then Step S3 is entered.

Figure 3:
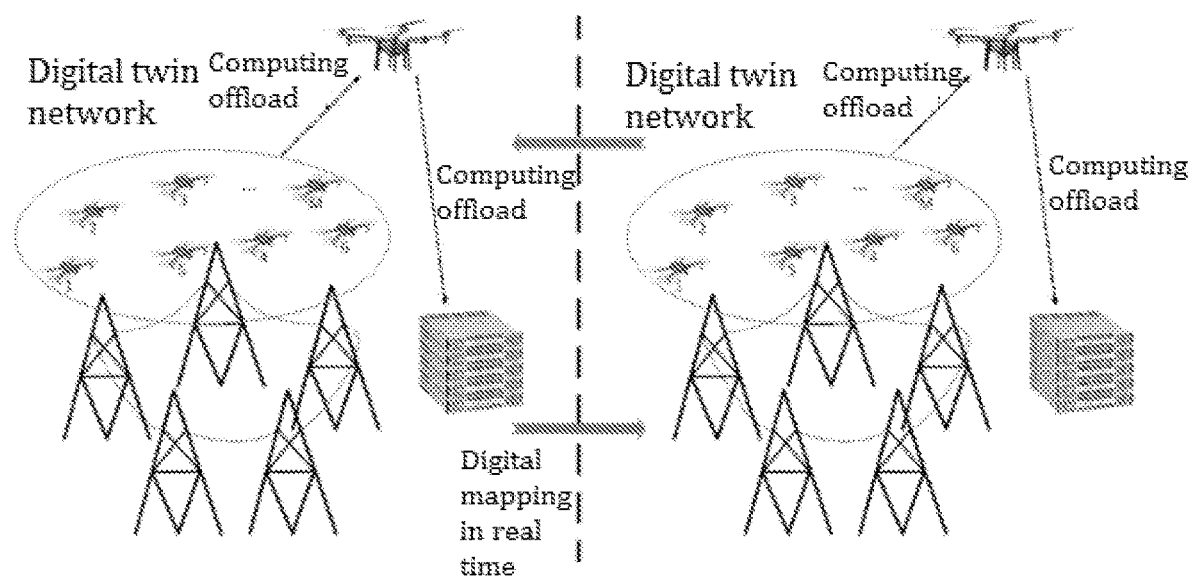
FIG. 3 illustrates a schematic diagram of a digital twin network for unmanned aerial vehicle-assisted PGL stochastic inspections in an application implementation designed in one embodiment of the present disclosure.

In Step S3, according to the video image data acquired and obtained by each of the inspection unmanned aerial vehicles corresponding to each time slot respectively, a digital twin network of the unmanned aerial vehicle-assisted power grid lines stochastic inspection system, in combination with a weight, a signal transmission power and position coordinates of each of the inspection unmanned aerial vehicles, a weight, a signal transmission power, position coordinates, and a computing capacity of the superior unmanned aerial vehicle, and position coordinates of the central base station, as well as a system communication bandwidth, a digital twin network of the unmanned aerial vehicle-assisted power grid lines stochastic inspection system is constructed as illustrated in FIG. 3, to fit the position coordinates of each of the inspection unmanned aerial vehicles and the superior unmanned aerial vehicle, and a resource status of the system, and then Step S4 is entered.

In one embodiment, the above-mentioned Step S3 is specifically executed in the following Step S31 to Step S33.

In Step S31, according to the unmanned aerial vehicle-assisted power grid lines stochastic inspection system, in combination with the weight of each of the inspection unmanned aerial vehicles, the video image data acquired by each of the inspection unmanned aerial vehicles respectively corresponding to each time slot, the signal transmission power of each of the inspection unmanned aerial vehicles, the weight of the superior unmanned aerial vehicle, the CPU calculation frequency allocated to each of the inspection unmanned aerial vehicles respectively corresponding to each time slot, and the signal transmission power of the superior unmanned aerial vehicle, and the position coordinates of the central base station, a real physical entity network is constructed, and then Step S32 is entered.

In Step S32, based on the real physical entity network, a digital twin model of each of the inspection unmanned aerial vehicles respectively corresponding to each time slot is constructed according to a following formula:

$$DT_m^{UAV}(t)=\{W_m^{UAV},D_m^{UAV}(t),P_m^{UAV}(t),L_m^{UAV}(t),P_{max}^{UAV}\}$$

where $DT_m^{UAV}(t)$ represents a digital twin model of the m-th inspection unmanned aerial vehicle corresponding to the t-th time slot, $W_m^{UAV}$ represents a weight of the m-th inspection unmanned aerial vehicle, $D_m^{UAV}(t)$ represents video image data acquired by the m-th inspection unmanned aerial vehicle corresponding to the t-th time slot, $P_m^{UAV}(t)$ represents a signal transmission power of the m-th inspection unmanned aerial vehicle corresponding to the t-th time slot, $L_m^{UAV}(t)$ represents position coordinates of the m-th inspection unmanned aerial vehicle corresponding to the t-th time slot, and $P_{max}^{UAV}$ represents a maximum signal transmission power of the m-th inspection unmanned aerial vehicle corresponding to the t-th time slot.

At the same time, a digital twin model of the superior unmanned aerial vehicle corresponding to each time slot is constructed according to a following formula:

$$DT^{SUAV}(t)=\{W^{SUAV},f^{SUAV}(t),P^{SUAV}(t),L^{SAUV}(t),P_{max}^{SUAV},f_{max}^{SUAV},c^{SUAV}\}$$

where $DT^{SAUV}(t)$ represents a digital twin model of the superior unmanned aerial vehicle corresponding to the t-th time slot, $W^{SUAV}$ represents a weight of the superior unmanned aerial vehicle, $f^{SUAV}(t)$ represents a CPU calculation frequency allocated to the superior unmanned aerial vehicle corresponding to the t-th time slot, $P^{SUAV}(t)$ represents a signal transmission power of the superior unmanned aerial vehicle corresponding to the t-th time slot, $L^{SAUV}(t)$ represents position coordinates of the superior unmanned aerial vehicle corresponding to the t-th time slot, $P_{max}^{SUAV}$ represents a maximum signal transmission power of the superior unmanned aerial vehicle corresponding to the t-th time slot, $f_{max}^{SUAV}$ represents a maximum CPU calculation frequency of the superior unmanned aerial vehicle, and $C^{SUAV}$ represents a number of CPU cycles required to processing data for 1-bit by the superior unmanned aerial vehicle.

Besides, a digital twin model $DT^{BS}$ of the central base station is constructed, according to a following formula:

$$DT^{BS} = \{L^{BS}\}$$

where $L^{BS}$ represents the position coordinates of the central base station, and then Step S33 is entered.

In Step S33, based on the digital twin models of each of the inspection unmanned aerial vehicles respectively corresponding to each time slot, the digital twin models of the superior unmanned aerial vehicle respectively corresponding to each time slot, and the digital twin model of the central base station, the digital twin network of the unmanned aerial vehicle-assisted power grid lines stochastic inspection system is constructed, to fit the position coordinates of each of the inspection unmanned aerial vehicles and the superior unmanned aerial vehicle, and the resource status of the system, and then Step S4 is entered.

In Step S4, according to the digital twin network of the unmanned aerial vehicle-assisted power grid lines stochastic inspection system, based on constraints of an offload latency and a data task processing latency for the power grid lines stochastic inspection system, an energy consumption model or a balanced energy consumption model of the unmanned aerial vehicle group respectively corresponding to the each time slot is constructed, and an objective function for minimizing energy consumption of the unmanned aerial vehicle group respectively corresponding to each time slot or an objective function for minimizing balanced energy consumption of the group unmanned aerial vehicle respectively corresponding to the each time slot is further constructed, and then Step S5 is entered.

In one embodiment, the above-mentioned Step S4 is specifically executed in the following Step S41 to Step S42.

In Step S41, according to the digital twin network of the unmanned aerial vehicle-assisted power grid lines stochastic inspection system, a general latency model of the video image data acquired by each of the inspection unmanned aerial vehicles at each time slot corresponding to each offload type respectively is constructed, and then Step S42 is entered.

The above-mentioned Step S41 herein is further specifically executed in the following Step S411 to Step S413.

In Step S411, based on that the inspection unmanned aerial vehicles are merely capable of choosing one between the superior unmanned aerial vehicle and the central base station to offload the video image data, in accordance with a fact that each of the inspection unmanned aerial vehicles communicates with the superior unmanned aerial vehicle respectively by adopting a NOMA mode, that is, the inspection unmanned aerial vehicles shares a common frequency spectrum to communicate with the superior unmanned aerial vehicle, that the superior unmanned aerial vehicle communicate with the central base station by adopting an OFDMA mode, that a data transmission rate between each of the inspection unmanned aerial vehicles and the superior unmanned aerial vehicle corresponding to the t-th time slot is $R_m^{UAV}(t)$, and that a data transmission rate between the m-th inspection unmanned aerial vehicle and the superior unmanned aerial vehicle corresponding to the t-th time slot is $R_m^{UAV}(t)$, and $$R_m^{UAV}(t) = B\log_2\left(1 + \frac{P_m^{UAV}(t)H_{m,SUAV}^{UAV}(t)}{\sum_{i=k+1,\rho(k)=m}^{\rho(M)} P_{\rho(i)}^{UAV}(t)H_{\rho(i),SUAV}^{UAV}(t) + \sigma^2}\right),$$

where B represents a bandwidth of a communication channel and $\sigma^2$ represents an additional gaussian white noise. $H_{m,SUAV}^{UAV}(t)$ represents a channel power gain between the m-th inspection unmanned aerial vehicle and the superior unmanned aerial vehicle within a time slot t, which is defined as $$H_{m,SUAV}^{UAV}(t) = \frac{g_0}{\sqrt{\|L_m^{UAV}(t) - L^{SUAV}(t)\|^2}},$$

where $g_0$ represents a path loss per unit distance. A receiving terminal of the superior unmanned aerial vehicle decodes stacked signals transmitted by the M inspection unmanned aerial vehicles by adopting a continuous interference cancellation (SIC) mode, and a decoding sequence is executed in a descending order of the channel gain. Within the t-th time slot, the descending order of the channel gain can be expressed as $H_{\rho(1),SUAV}^{UAV}(t) \geq H_{\rho(2),SUAV}^{UAV}(t) \geq \ldots \geq H_{\rho(M),SUAV}^{UAV}(t)$, and the k-th channel gain in the descending sequence can be expressed as $\rho(k) \in M$; and $$\sum_{i=k+1,\rho(k)=m}^{\rho(M)} P_{\rho(i)}^{UAV}(t)H_{\rho(i),SUAV}^{UAV}(t)$$

represents an interference of the other inspection unmanned aerial vehicles $\{k+1, \ldots, \rho(M)\}$ with the data transmission rate when m-th inspection unmanned aerial vehicle is uploading data.

Within any time slot, the superior unmanned aerial vehicle communicates with the central base station by adopting the OFDMA (orthogonal frequency division multiple access) mode. According to a Shannon formula, a data transmission rate between the superior unmanned aerial vehicle and the central base station is $$R^{SUAV}(t) = B\log_2\left(1 + \frac{P^{SUAV}(t)H_{SUAV}^{BS}(t)}{\sigma^2}\right),$$

where $H_{SUAV}^{BS}(t)$ represents a channel power gain between the superior unmanned aerial vehicle and the central base station within a t-th time slot, which is defined as $$H_{SUAV}^{BS}(t) = \frac{g_0}{\sqrt{\|L^{BS} - L^{SUAV}(t)\|^2}}.$$

The video image data acquired by the corresponding m-th inspection unmanned aerial vehicle at the t-th time slot are offloaded to the superior unmanned aerial vehicle for processing. Since the amount of the data in processing results is relatively small, transmission latency and transmission energy consumption of the processing results from the superior unmanned aerial vehicle to the central base station can be ignored. The video image data acquired by the corresponding m-th inspection unmanned aerial vehicle at the t-th time slot is offloaded to the central base station for processing. Since power is supplied to the central base station by adopting a wired mode, computing energy consumption of the central base station can be ignored. Besides, only one offload mode can be chosen by the m-th inspection unmanned aerial vehicle within one time slot.

Further, a communication latency model $transT_{m,SUAV}^{UAV}(t)$ between each of the inspection unmanned aerial vehicles and the superior unmanned aerial vehicle corresponding to each time slot is constructed according to a following formula:

$$transT_{m,SUAV}^{UAV}(t) = \frac{D_m^{UAV}(t)}{R_m^{UAV}(t)},$$

where $transT_{m,SUAV}^{UAV}(t)$ represents a communication latency between the m-th inspection unmanned aerial vehicle and the superior unmanned aerial vehicle corresponding to the t-th time slot, and $D_m^{UAV}(t)$ represents the video image data acquired by the the m-th inspection unmanned aerial vehicles corresponding to the t-th time slot.

In addition, a communication latency model $transT_{m,BS}^{SUAV}(t)$ of the video image data acquired by each of the inspection unmanned aerial vehicles corresponding to each time slot respectively transmitted between the superior unmanned aerial vehicle and the central base station is constructed, according to a following formula:

$$transT_{m,BS}^{SUAV}(t) = \frac{D_m^{UAV}(t)}{R^{SUAV}(t)},$$

where $transT_{m,BS}^{SUAV}(t)$ represents a communication latency of the video image data acquired by the m-th inspection unmanned aerial vehicle corresponding to the t-th time slot transmitted between the superior unmanned aerial vehicle and the central base station; and then Step S412 is entered.

In Step S412, based on a fact that the video image data acquired by the m-th inspection unmanned aerial vehicle at the t-th time slot corresponding to a definition $a_m^{UAV}(t)=0$ are offloaded to the superior unmanned aerial vehicle for processing, a data processing latency model $comT_m^{SUAV}(t)$ at a receiving terminal of the superior unmanned aerial vehicle for the video image data acquired by the m-th inspection unmanned aerial vehicle at the t-th time slot is constructed according to a following formula:

$$comT_m^{SUAV}(t) = \frac{D_m^{UAV}(t)C^{SUAV}}{f^{SUAV}(t)},$$

where $C^{SUAV}$ represents the number of CPU cycles required to processing data for 1-bit by the superior unmanned aerial vehicle, and $f^{SUAV}(t)$ represents the CPU calculation frequency allocated to the superior unmanned aerial vehicle corresponding to the t-th time slot.

Based on a fact that the superior unmanned aerial vehicle processes the video image data in a non preemptive mode in accordance with a channel power gain descending mode, a queue waiting latency model $queT_m^{SUAV}$ for the video image data acquired by the m-th inspection unmanned aerial vehicle at the t-th time slot before being processed by the superior unmanned aerial vehicle is constructed according to a following formula:

$$queT_m^{SUAV} = \sum_{i=1,\rho(k)=m}^{k-1} (1 - a_{\rho(i)}^{UAV}(t))comT_{\rho(i)}^{SUAV}(t),$$

where $\rho(i)$ represents a sequence number of the inspection unmanned aerial vehicles from which the superior unmanned aerial vehicle sequentially processes i-th video image data, and k represents a sequence number of the video image data acquired by the m-th inspection unmanned aerial vehicle at the t-th time slot waiting to be processed by the superior unmanned aerial vehicle.

Then a general latency model $T_{m,0}(t)$ corresponding to offloading the video image data acquired by the m-th inspection unmanned aerial vehicle at the t-th time slot to the superior unmanned aerial vehicle for processing is constructed according to a following formula:

$$T_{m,0}(t) = transT_{m,SUAV}^{UAV}(t) + comT_m^{SUAV}(t) + queT_m^{SUAV},$$

and then Step S413 is entered.

In Step S413, based on a fact that the video image data acquired by the m-th inspection unmanned aerial vehicle at the t-th time slot corresponding to a definition $a_m^{UAV}(t)=1$ are offloaded to the superior unmanned aerial vehicle for processing, a general latency model $T_{m,1}(t)$ corresponding to offloading the video image data acquired by the m-th inspection unmanned aerial vehicle at the t-th time slot to the central base station for processing is constructed according to a following formula:

$$T_{m,1}(t) = transT_{m,BS}^{SUAV}(t) + queT_m^{SUAV}$$

and then Step S42 is entered.

In Step S42, according to the general latency model of the video image data acquired by each of the inspection unmanned aerial vehicles at each time slot corresponding to each offload type respectively, based on the constraints of the offload latency and the data task processing latency for the power grid lines stochastic inspection system, the energy consumption model or the balanced energy consumption model of the unmanned aerial vehicle group corresponding to each time slot respectively is constructed, and further the objective function for minimizing energy consumption of the unmanned aerial vehicle group respectively corresponding to the each time slot is constructed, and then Step S5 is entered.

In one embodiment, the above-mentioned Step S42 is further designed to execute the following Step S421 to Step S422.

Step S42 includes Step S421 to Step S422.

In Step S421, an energy consumption model $E^{all}(t)$ of the unmanned aerial vehicle group corresponding to the t-th time slot is constructed by a wired power supply mode based on the central base station according to a following formula:

$$E^{all}(t) = \sum_{m=1}^{M} \begin{bmatrix} flyE_m^{UAV}(t) + transE_{m,SUAV}^{UAV}(t) + (1 - a_m^{UAV}(t))comE_m^{SUAV}(t) \\ + a_m^{UAV}(t)(2 - a_m^{UAV}(t))transE_{m,BS}^{SUAV}(t) \end{bmatrix} + flyE^{SUAV}(t),$$

where $$flyE_m^{UAV}(t) = \frac{W_m^{UAV}}{2\tau} \|L_m^{UAV}(t) - L_m^{UAV}(t-1)\|^2,$$

flyE$^{SUAV}$(t) represents a flight energy consumption of the m-th inspection unmanned aerial vehicle at the t-th time slot;

$$flyE^{SUAV}(t) = \frac{W^{UAV}}{2\tau}\left\|L^{SUAV}(t) - L^{SUAV}(t-1)\right\|^2,$$

flyE$^{SUAV}$(t) represents a flight energy consumption of the superior unmanned aerial vehicle at the t-th time slot; comE$_m^{SUAV}$(t)=$\kappa^{SUAV}$f$^{SUAV}$(t)$^2$C$^{SUAV}$D$_m^{SUAV}$(t), comE$_m^{SUAV}$(t) represents an energy consumed by offloading the video image data acquired by the m-th inspection unmanned aerial vehicle at the t-th time slot to the superior unmanned aerial vehicle for processing, $\kappa^{SUAV}$ represents an effective switched capacitor corresponding to a CPU of the superior unmanned aerial vehicle; transE$_{m,SUAV}^{UAV}$(t)= transT$_{m,SUAV}^{UAV}$(t)P$_m^{UAV}$(t), transE$_{m,SUAV}^{UAV}$(t) represents an transmission energy consumption of transmitting the video image data D$_m^{UAV}$(t) acquired by the m-th inspection unmanned aerial vehicle at the t-th time slot with the superior unmanned aerial vehicle; transE$_{m,BS}^{SUAV}$(t)= transT$_{m,BS}^{SUAV}$(t)P$^{SUAV}$(t), and transE$_{m,BS}^{SUAV}$(t) represents an transmission energy consumption of data D$_m^{UAV}$(t) between the superior unmanned aerial vehicle and the central base station, and then Step S422 is entered.

In Step S422, based on an energy consumption model E$^{all}$(t) of the unmanned aerial vehicle group corresponding to the t-th time slot, an objective function $$\min_{\substack{P_m^{UAV}(t), P^{SUAV}(t) \\ L^{SUAV}(t), a_m^{UAV}(t) \\ f^{SUAV}(t)}} E^{all}(t)$$

for minimizing energy consumption of the unmanned aerial vehicle group corresponding to each time slot is further constructed according to the following formulas:

$$\min_{\substack{P_m^{UAV}(t), P^{SUAV}(t) \\ L^{SUAV}(t), a_m^{UAV}(t) \\ f^{SUAV}(t)}} E^{all}(t)$$

s.t. C1: $a_m^{UAV}(t) = \{0, 1\}, \forall m \in M$

C2: $0 < P_m^{UAV}(t) \leq P_{max}^{UAV}, \forall m \in M$

C3: $0 < P^{SUAV}(t) \leq P_{max}^{SUAV}$

C4: $0 < f^{SUAV}(t) \leq f_{max}^{SUAV}$

C5: $x_{min} \leq x(t) < x_{max}$

C6: $y_{min} \leq y(t) < y_{max}$

C7: $h_{min} \leq h(t) < h_{max}$

C8: $R_m^{UAV}(t) \geq R^{SUAV}(t), \forall m \in M$

C9: $\left(1 - a_m^{UAV}(t)\right)T_{m,0}(t) + a_m^{UAV}(t)\left(2 - a_m^{UAV}(t)\right)T_{m,1}(t) \leq \tau, \forall m \in M,$ where C5 to C7 represent preset motion ranges for constraining the superior unmanned aerial vehicle, C8 represents a conditional requirement for a full-duplex communication of the superior unmanned aerial vehicle, and C9 represents that the video image data D$_m^{UAV}$(t) acquired by the m-th inspection unmanned aerial vehicle at the t-th time slot needs to be offloaded and processed within the time slot.

In one embodiment, the above-mentioned Step S42 is further designed to execute the following Step S421' to Step S422'

In Step S421', a balanced energy consumption model E$_{even}^{all}$(t) of the unmanned aerial vehicle group corresponding to the t-th time slot is constructed by a wired power supply mode based on the central base station according to a following formula:

$$E_{even}^{all}(t) = \sum_{m=1}^{M}\left[flyE_m^{UAV}(t) + transE_{m,SUAV}^{UAV}(t) + \right.$$
$$\left(1 - a_m^{UAV}(t)\right)comE_m^{SUAV}(t) + a_m^{UAV}(t)\left(2 - a_m^{UAV}(t)\right)transE_{m,BS}^{SUAV}(t)\right] +$$
$$flyE^{SUAV}(t) + \chi \sum_{m=1}^{M}\sum_{m'=1, m\neq m'}^{M}\left|\left(flyE_m^{UAV}(t) + transE_{m,SUAV}^{UAV}(t)\right) - \right.$$
$$\left.\left(flyE_{m'}^{UAV}(t) + transE_{m',SUAV}^{UAV}(t)\right)\right|$$

where $\chi$ represents a balanced energy consumption coefficient, $$flyE_m^{UAV}(t) = \frac{W_m^{UAV}}{2\tau}\left\|L_m^{UAV}(t) - L_m^{UAV}(t-1)\right\|^2,$$

flyE$_m^{UAV}$(t) represents a flight energy consumption of the m-th inspection unmanned aerial vehicle at the t-th time slot;

$$flyE^{SUAV}(t) = \frac{W^{SUAV}}{2\tau}\left\|L^{SUAV}(t) - L^{SUAV}(t-1)\right\|^2,$$

fyE$^{SUAV}$(t) represents a flight energy consumption of the superior unmanned aerial vehicle at the t-th time slot; comE$_m^{SUAV}$(t)=$\kappa^{SUAV}$ f$^{SUAV}$(T)$^2$C$^{SUAV}$D$_m^{UAV}$(t), comE$_m^{SUAV}$(t) represents an energy consumed by offloading the video image data acquired by the m-th inspection unmanned aerial vehicle at the t-th time slot to the superior unmanned aerial vehicle for processing, $\kappa^{SUAV}$ represents an effective switched capacitor corresponding to a CPU of the superior unmanned aerial vehicle; transE$_{m,SUAV}^{UAV}$(t)=transT$_{m,SUAV}^{UAV}$(t)P$_m^{UAV}$(t), transE$_{m,SUAV}^{UAV}$(t) represents a transmission energy consumption of transmitting the video image data D$_m^{UAV}$(t) acquired by the m-th inspection unmanned aerial vehicle at the t-th time slot with the superior unmanned aerial vehicle; transE$_{m,BS}^{SUAV}$(t)= transT$_{m,BS}^{SUAV}$(t)P$^{SUAV}$(t), and transE$_{m,BS}^{SUAV}$(t) represents a transmission energy consumption of data D$_m^{UAV}$(t) between the superior unmanned aerial vehicle and the central base station, and then Step S422' is entered.

In Step S422', based on a balanced energy consumption model E$^{all}$(t) of the unmanned aerial vehicle group corresponding to the t-th time slot, an objective function $$\min_{\substack{P_m^{UAV}(t), P^{SUAV}(t) \\ L^{SUAV}(t), a_m^{UAV}(t) \\ f^{SUAV}(t)}} E_{even}^{all}(t)$$

for minimizing energy consumption of the unmanned aerial vehicle group corresponding to each time slot is constructed, according to the following formulas:

$$\min_{\substack{P_m^{UAV}(t), P^{SUAV}(t) \\ L^{SUAV}(t), a_m^{UAV}(t) \\ f^{SUAV}(t)}} E_{even}^{all}(t)$$

s.t. C1: $a_m^{UAV}(t) = \{0, 1\}, \forall m \in M$

C2: $0 < P_m^{UAV}(t) \leq P_{max}^{UAV}, \forall m \in M$

C3: $0 < P^{SUAV}(t) \leq P_{max}^{SUAV}$

C4: $0 < f^{SUAV}(t) \leq f_{max}^{SUAV}$

C5: $x_{min} \leq x(t) < x_{max}$

C6: $y_{min} \leq y(t) < y_{max}$

C7: $h_{min} \leq h(t) < h_{max}$

C8: $R_m^{UAV}(t) \geq R^{SUAV}(t), \forall m \in M$

C9: $(1 - a_m^{UAV}(t))T_{m,0}(t) + a_m^{UAV}(t)(2 - a_m^{UAV}(t))T_{m,1}(t) \leq \tau, \forall m \in M,$ where C5 to C7 represent preset motion ranges for constraining the superior unmanned aerial vehicle, C8 represents a conditional requirement for a full-duplex communication of the superior unmanned aerial vehicle, and C9 represents that the video image data $D_m^{UAV}(t)$ acquired by the m-th inspection unmanned aerial vehicle at the t-th time slot needs to be offloaded and processed within the time slot.

In Step S5, the position coordinates of the superior unmanned aerial vehicle are randomly initialized, and based on the position coordinates and the video image data of each of the inspection unmanned aerial vehicles respectively corresponding to a t-th time slot, a system status at the t-th time slot is constructed, and then Step S6 is entered.

In Step S6, the energy consumption model of the unmanned aerial vehicle group corresponding to each time slot respectively is solved by adopting a DDPG algorithm in a deep reinforcement learning, based on the position coordinates of the superior unmanned aerial vehicle and the system status at the t-th time slot, according to the objective function for minimizing energy consumption of the unmanned aerial vehicle group respectively corresponding to each time slot or the objective function for minimizing balanced energy consumption of the unmanned aerial vehicle group corresponding to each time slot respectively; an action space of the system at the t-th time slot corresponding to the system status at the t-th time slot in combination with the position coordinates of the superior unmanned aerial vehicle, that is, the action space of the system at the t-th time slot corresponding to the system status at the t-th time slot in combination with the position coordinates of the superior unmanned aerial vehicle is obtained, and the action space of the system at the t-th time slot is composed of the signal transmission power of each of the inspection unmanned aerial vehicles corresponding to the t-th time slot respectively, an offload mode of each of the inspection unmanned aerial vehicles corresponding to the t-th time slot respectively regarding the superior unmanned aerial vehicle or the central base station, and the signal transmission power and an allocated CPU calculation frequency of the superior unmanned aerial vehicle corresponding to the t-th time slot, and then Step S7 is entered.

The above-mentioned Step S6 is specifically executed in the following operations.

Firstly, two groups of neural networks are constructed, separately named as an Actor network group and a Critic network group. The Actor network group includes two deep neural networks with the same parameters, that is, an Actor policy network with all parameters marked as $\theta^\mu$ and an Actor target network with all parameters marked as $\theta^{\mu'}$. The Critic network group includes two deep neural networks with the same parameters, that is, a Critic policy network with all parameters marked as $\theta^Q$ and a Critic target network with all parameters marked as $\theta^{Q'}$.

Then, based on the position coordinates of the superior unmanned aerial vehicle, within the t-th time slot, a current system status $s_t$ is input into the Actor policy network, actions $\mu(s_t)$ is output by attaching stochastic noises $N_t$ to form action decisions $a_t$ for interacting with the environment, that is, $a_t = \mu(s_t|\theta^\mu) + N_t$, thus obtaining rewards $r_i$ and entering the next time slot status of the system, and at the same time, this record $\{s_t, a_t, r_t, s_{t+1}\}$ is stored in an experience playback pool.

The current system status $s_t$, the action spaces $a_t$, and reward function $r_t$ are separately represented as follows:

$s_t = \{L_1^{UAV}(t), L_2^{UAV}(t), \ldots, L_m^{UAV}(t), \ldots, L_M^{UAV}(t),$
$\quad D_1^{UAV}(t), D_2^{UAV}(t), \ldots, D_m^{UAV}(t), \ldots,$
$\quad D_M^{UAV}(t)\}.$ The selectable action spaces based on the current system status $s_t$ are that $a_t = \{P_1^{UAV}(t), P_2^{UAV}(t), \ldots, P_m^{UAV}(t), \ldots,$
$\quad P_M^{UAV}(t), a_1^{UAV}(t), a_2^{UAV}(t), \ldots,$
$\quad a_m^{UAV}(t), \ldots, a_M^{UAV}(t), f^{SUAV}(t), P^{SUAV}(t)\}.$ Based on the current system status $s_t$ and the action decisions at the status, the obtained rewards $r_i$ are defined as:

$r_i = E_{even}^{all}(t) - 1000,$ where $-1000$ in the reward function represents a penalty term. When the conditional requirement for a full-duplex communication of the superior unmanned aerial vehicle is not satisfied or the data acquired by the inspection unmanned aerial vehicles within the t-th time slot is not completely offloaded within this time slot, a default penalty value $-1000$ is given accordingly.

Figure 4:
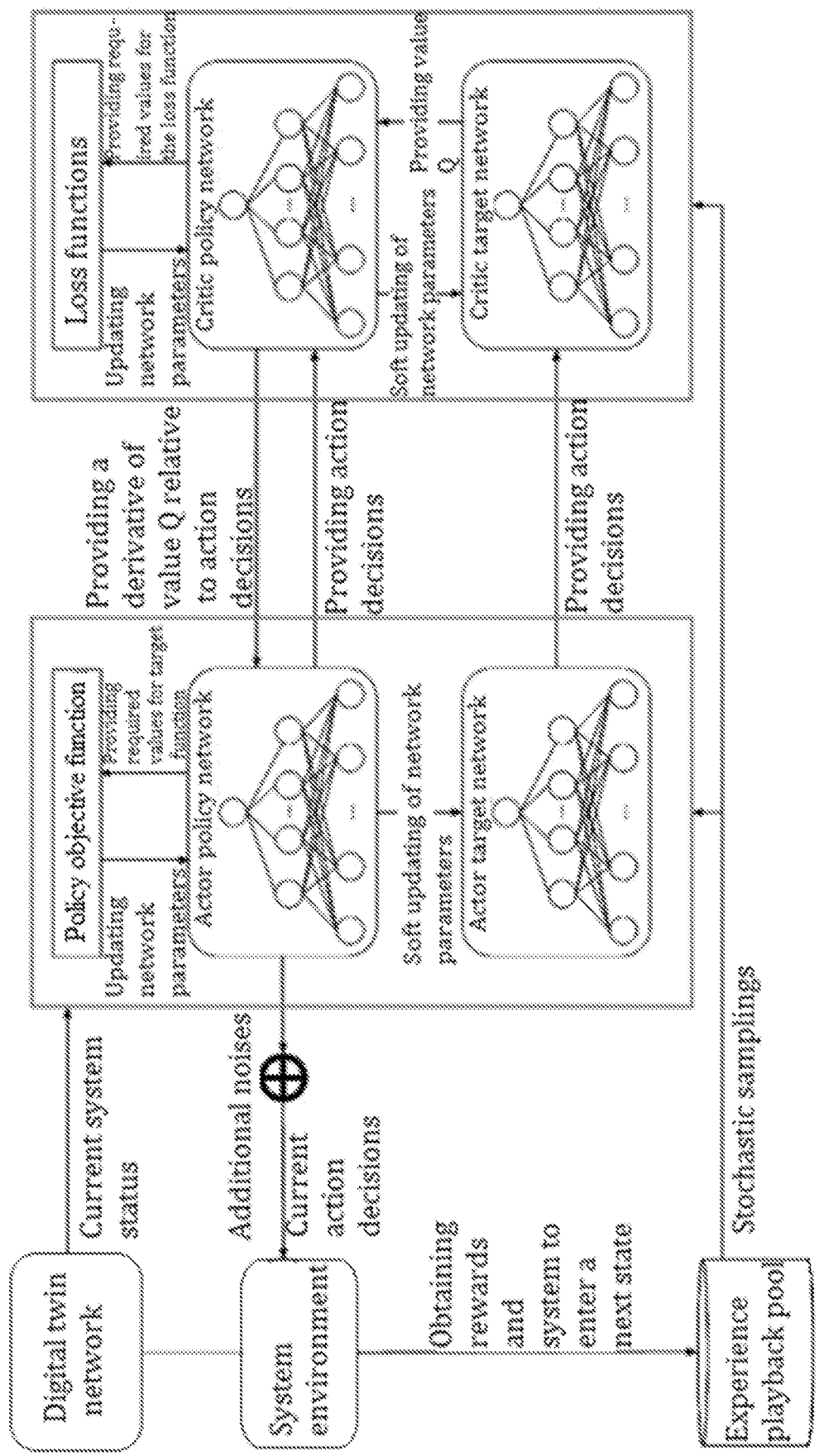
FIG. 4 illustrates a schematic diagram of DDPG for solving system resources allocations and task offload decision schemes in an application implementation designed in one embodiment of the present disclosure.

The above specific execution operations related to Step S6, the DDPG algorithm in the deep reinforcement learning in one embodiment, is executed specifically as follows as illustrated in FIG. 4.

In S61, starting from the first time slot, the above operations are repeated until the experience playback pool is filled.

In S62, N samples are randomly selected from the experience playback pool and one of the N samples is recorded as $\{s_i, a_i, r_i, s_{i+1}\}$.

In S63, status $s_{i+1}$ and action decisions $\mu'(s_{i+1}|\theta^{\mu'})$ are input into the Critic target network, and values Q obtained based on the current status and action decisions are output, and the values Q is $Q'(s_{i+1}, \mu'(s_{i+1}|\theta^{\mu'})|\theta^{Q'})$, where action decisions $\mu'(s_{i+1}|\theta^{\mu'})$ are provided by the Actor target network based on status $s_{i+1}$, and are recorded as $y_i = r_i + \gamma Q'(s_{i+1}, \mu'(s_{i+1}|\theta^{\mu'})|\theta^{Q'})$.

In S64, status $s_i$ and action decisions $a_i$ are input into the Critic policy network, and the values Q obtained based on the current status and action decisions are output, and the values Q is $Q(s_i, a_i|\theta^Q)$.

In S65, a following loss function is adopted to update the parameters $\theta^Q$ for the Critic policy network:

$$L(\theta^Q) = \frac{1}{N}\sum_i (y_i - Q(s_i, a_i|\theta^Q))^2.$$

In S66, the parameters $\theta^\mu$ for the Actor policy network is updated by adopting a policy gradient ascent method to implement a maximization of the policy objective function $J(\theta^\mu)$ $$\nabla_{\theta^\mu} J \approx \frac{1}{N}\sum_i \nabla_a Q(s, a|\theta^Q)|_{s=s_i, a=\mu(s_i)} \nabla_{\theta^\mu} \mu(s|\theta^\mu)|_{s_i},$$

where $\mu(s|\theta^\mu)|_{s_i}$ is the action decisions obtained by the Actor policy network based on status $s_i$, and $\Sigma_i \nabla_a Q(s,a|\theta^Q)|_{s=s_i, a=\mu(s_i)}$ is the value Q obtained by the Critic policy network based on the status $s_i$ and the action decisions $\mu(s|\theta^\mu)|_{s_i}$.

In S67, the parameters $\theta^{\mu'}$ for the Actor target network and the parameters $\theta^{Q'}$ for the Critic target network are updated regularly by using a soft updating mode:

$$\theta^{\mu'} = \upsilon\theta^\mu + (1-\upsilon)\theta^{\mu'}$$

$$\theta^{Q'} = \upsilon\theta^Q + (1-\upsilon)\theta^{Q'}$$

In Step S7, whether iteration overflow condition is satisfied or not is determined, if yes, Step S8 is entered, if no, the position coordinates of the superior unmanned aerial vehicle are solved and updated by using a genetic algorithm based on the system status at the t-th time slot, in combination with system resource allocations and offload decision schemes for the video image data in the action space of the system at the t-th time slot corresponding to the position coordinates of the superior unmanned aerial vehicle, and Step S6 is returned.

The iteration overflow condition is that a maximum preset iteration number, or a variance of the energy consumption of the unmanned aerial vehicle group corresponding to the t-th time slot in each iteration within a preset iteration number starting from a current iteration direction towards a historical iteration direction, is less than a preset range of energy consumption fluctuations.

In one embodiment, in the above-mentioned Step S7, when the iteration overflow conditions are not satisfied, the following Step S71 to Step S71 are executed.

In Step S71, a population $K(t)=\{L_1^{UAV}(t), L_2^{SUAV}(t), \ldots, L_i^{SUAV}(t), \ldots, L_I^{SUAV}(t)\}$ at the t-th time slot is randomly initialized, where $1 \leq i \leq I$, I represents a number of individuals in the population K(t) at the t-th time slot, and $L_i^{SUAV}(t)$ represents i-th position coordinates of the superior unmanned aerial vehicle in the population K(t) at the t-th time slot, and then Step S72 is entered.

In practical applications, a phenotype of the position coordinates of the superior unmanned aerial vehicle is further transformed into a genotype by using a binary encoding mode, and a binary encoding method specifically lies in the following.

A range of x(t) is $[x_{min}, x_{max}]$, and the parameter is expressed by a binary coding symbol with a length of ε, that is, this interval is divided into $2^\varepsilon - 1$ parts, and similarly, $[y_{min}, y_{max}]$ and $[h_{min}, h_{max}]$ are also divided into $2^\varepsilon - 1$ parts.

The genotype corresponding to x(t) represents data at an interval $[0, x_{max} - x_{min}]$, the same as y(t) and h(t), thus the genotype of one individual can be expressed as:

$$\underline{10100 \ldots}_{[0, x_{max}-x_{min}]}, \underline{11010 \ldots}_{[0, y_{max}-y_{min}]}, \underline{01001 \ldots}_{[0, h_{max}-h_{min}]}.$$

In Step S72, for each of the individuals in the population K(t) at the t-th time slot respectively, based on the system status at the t-th time slot, in combination with system resource allocations and offload decision schemes for the video image data in the action space of the system at the t-th time slot corresponding to the position coordinates of the superior unmanned aerial vehicle, a fitness respectively corresponding to each of the individuals in the population K(t) at the t-th time slot is obtained according to a following formula:

$$Fit(t)_{L_i^{SUAV}(t)} = \frac{1}{1 + E_{even}^{all}(t)_{L_i^{SUAV}(t)}},$$

and then Step S73 is entered.

In Step S73, whether the fitness corresponding to each of the individuals in the population K(t) at the t-th time slot satisfied a preset fitness threshold or not is determined, if yes, an individual corresponding to a highest fitness is selected, that is, position coordinates of the superior unmanned aerial vehicle corresponding to the individual are obtained and the position coordinates of the superior unmanned aerial vehicle are updated, and then Step S6 is returned; if no, based on the fitness of each of the individuals in the population K(t) at the t-th time slot, data in the population K(t) at the t-th time slot are selected, crossed, and mutated, and each of the individuals in the population K(t) at the t-th time slot is updated, and then Step S72 is returned. Corresponding to the binary encoding conversion operation adopted between Step S71 and Step S72, decoding herein (y(t) and h(t) as the same) is as follows:

$$x(t) = x_{min} + \left(\sum_{i=1}^{\varepsilon} b_i 2^{i-1}\right) \frac{x_{max} - x_{min}}{2^\varepsilon - 1},$$

where $b_i$ represents a binary number of the i-th digit.

In one embodiment, the preset fitness threshold herein is a lower limit of the preset fitness, when the preset fitness threshold is the lower limit of the preset fitness, whether the fitness corresponding to each of the individuals respectively in the population K(t) at the t-th time slot is greater than the lower limit of the preset fitness or not is determined.

In Step S8, according to the position coordinates of the superior unmanned aerial vehicle, and the system resource allocations and the offload decision schemes for the video image data in the action space of the corresponding system at the t-th time slot, the video image data acquired and obtained by each of the inspection unmanned aerial vehicles corresponding to each time slot in Step S2 are processed to offload the video image data to the superior unmanned aerial vehicle or the central base station for processing. The identification for the power grid system defects and the positioning for the power grid system defect are executed by the superior unmanned aerial vehicle or the central base station for the video image data offloaded by the inspection unmanned aerial vehicles.

Figure 5:
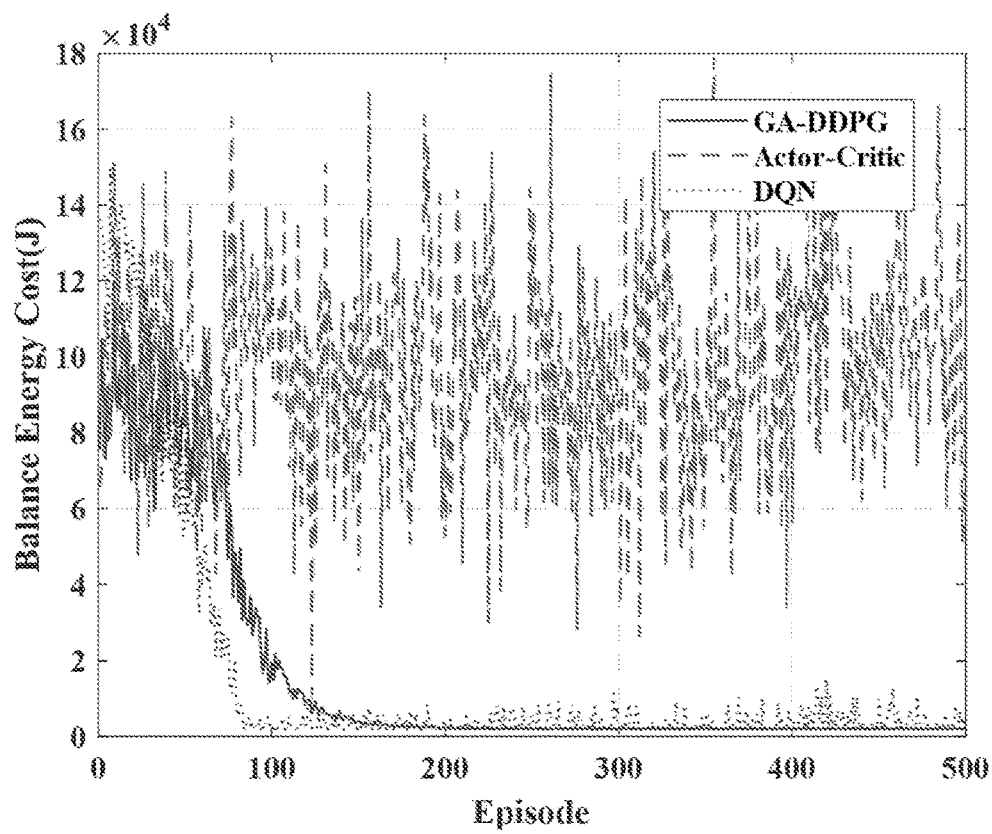
FIG. 5 illustrates a performance chart of average balanced energy consumption of the system corresponding to different algorithm schemes in an application implementation designed in one embodiment of the present disclosure.

The method for stochastic inspections on power grid lines based on unmanned aerial vehicle-assisted edge computing integrated with a mobile edge computing designed by the present disclosure is applied to practical applications. The performance comparison between different algorithm schemes under a condition of M=3 is as illustrated in FIG. 5. The Actor-Critical algorithm cannot reach a convergence status with an increase of the training times, that is because the Actor-Critical algorithm needs to synchronously update the Actor network and the Critic network during the training process, while the selection of the action decisions for the Actor network depends on the value evaluation provided by the Critic network. Considering that the Critic network itself is difficult to converge, the Actor-Critical algorithm is more difficult to converge in some scenarios. By contrast, thanks to a dual-network structure of the Critic evaluation network and the Critic target network, the correlations between the target value Q and the evaluation value Q are cut off by the DQN (Deep Q-Network) and the GA-DDPG (Goal-Auxiliary DDPG) during the training process, promoting the convergence of the Critic network. In addition, it can be seen from the figure that the DQN algorithm converges at an Episode=90 and the GA-DDPG algorithm converges at an Episode=200. Compared with the GA-DDPG algorithm, the DQN algorithm has a relatively fast converging rate but poor converging effects, that is because the DQN algorithm adopted by the present disclosure discretizes the continuous action spaces, reducing a breadth of the utilizable action spaces, leading that the best action decisions can not be found continuously and accurately, thus, the fluctuation phenomenon is observed in the balanced energy consumption of the system during the algorithm convergence stage.

Figure 6:
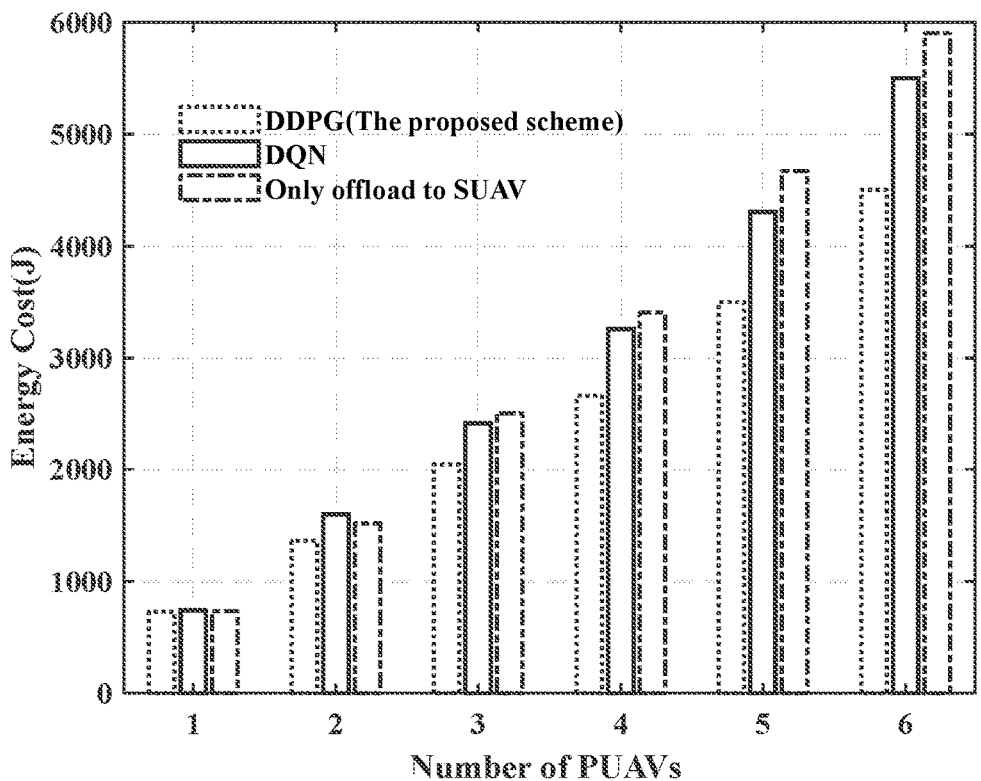
FIG. 6 illustrates a relationship chart between the number of inspection unmanned aerial vehicles and balanced energy consumption of the system corresponding to the different algorithm schemes in an application implementation designed in one embodiment of the present disclosure.

The balanced energy consumption results obtained after by using the algorithm convergence, three algorithmic schemes under different settings for the number of inspection unmanned aerial vehicles (PUAVs) are compared, specifically including three schemes of GA-DDPG, DQN, and offloading all computing tasks to the superior unmanned aerial vehicle and the results are as illustrated in FIG. 6. It can be observed that for the same number of the inspection unmanned aerial vehicles, the balanced energy consumption of the system optimized by the GA-DDPG algorithm is lower compared with the DQN. That is because the GA-DDPG algorithm explores a continuous action space, takes precise actions, and finally obtains the optimal strategy, which significantly reduces the balanced energy consumption of the system, while the discretizations of actions in the DQN algorithm may cause the algorithm to skip better actions. In addition, balanced energy consumption of the system increases with an increase of the number of the inspection unmanned aerial vehicles, and as the number of the inspection unmanned aerial vehicles increases, the gap between the balanced energy consumption of the system optimized by the GA-DDPG algorithm and the DQN algorithm gradually widens. This is because the number of variables in the action spaces increases with the increase of the number of the inspection unmanned aerial vehicles, and more variables lead to an increase in the probability of the DQN algorithm skipping better actions, and thus optimization effects of the DQN algorithm gradually deteriorates. Finally, in the case of adopting the scheme of offloading all computing tasks to the superior unmanned aerial vehicle, when the number of the inspection unmanned aerial vehicles is relatively small, the gap of effects between this scheme and the DQN and the GA-DDPG is not significant. As the number of inspection unmanned aerial vehicles increases, the disadvantages of this scheme gradually become prominent, this is because a MEC server embedded in an terminal of the superior unmanned aerial vehicle cannot satisfy more computing needs, it is more reasonable to offload the computing tasks acquired by individual inspection unmanned aerial vehicles to the central base station at this time.

Figure 7:
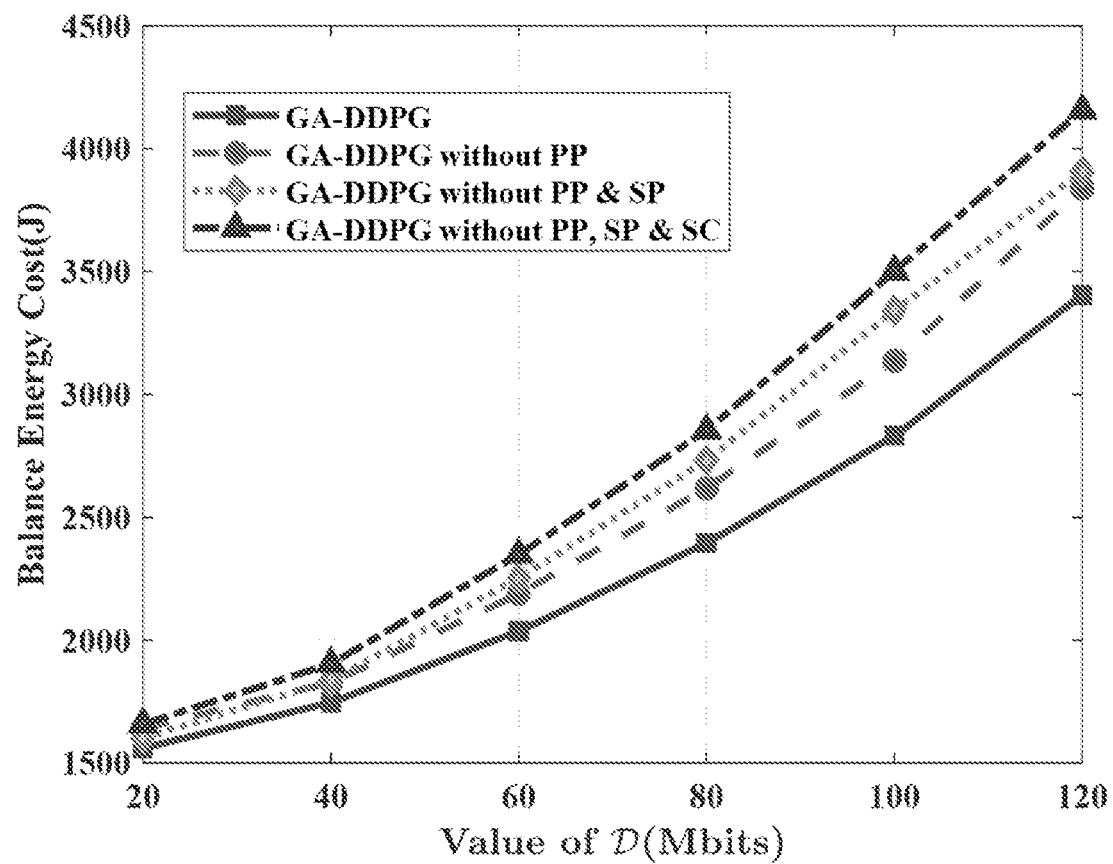
FIG. 7 illustrates comparisons of the balanced energy consumption of the system relative to a value D corresponding to different schemes in an application implementation designed in one embodiment of the present disclosure.

FIG. 7 illustrates comparisons between the balanced energy consumption of the system under different schemes relative to a value D when M=3 (it is affirmed that the amount of data acquired by the inspection unmanned aerial vehicles at any time slot follows a gaussian distribution with a mean value D). The blue curve represents the scheme proposed by the present disclosure, the purple curve represents the transmission power (PP) of the inspection unmanned aerial vehicles that has not been optimized based on the proposed scheme, the green curve represents the PP and the transmission power of the superior unmanned aerial vehicle (SP) that have not been optimized based on the proposed scheme, and the red curve represents the PP, the SP and the computing resources of the superior unmanned aerial vehicle (SC) that have not been optimized based on the proposed scheme. The following points can be seen from the figure. Firstly, as the value D increases, the balanced energy consumption of the system of the above four schemes increases respectively, this is because in general situations, an increase in the value D means that the amount of tasks acquired by each of the inspection unmanned aerial vehicles at different time slots increases, resulting in the consumption of more computing and communication resources. Secondly, by jointly optimizing the PP, the SP, and the SC, the performance of the scheme proposed by the present disclosure has been significantly improved and superior to the other three schemes. Finally, it can be observed that the performance gap between the blue curve and the purple curve is relatively significant, this is because the number of inspection unmanned aerial vehicles is not one. Therefore, optimizing the PP is equivalent to optimizing a plurality of variables, and synchronous optimization of a plurality of variables further improves the performance of the blue curve.

The detailed descriptions of the embodiments of the present disclosure are provided in conjunction with the accompanying drawings. However, the present disclosure is not limited to the above embodiments. Within the knowledge range possessed by ordinary technicians in the art, various variations can be made without departing from the objectives of the present disclosure.

What is claimed is:

1. A method for stochastic inspections on power grid lines based on unmanned aerial vehicle-assisted edge computing, wherein an inspection is conducted on a target power gird area including power grid equipment and power transmission lines by applying an unmanned aerial vehicle group including M inspection unmanned aerial vehicles and a superior unmanned aerial vehicle based on a central base station arranged on a fixed position; comprising following steps:

Step S1, constructing, based on a flight mode of each of the inspection unmanned aerial vehicles in the unmanned aerial vehicle group, an unmanned aerial vehicle-assisted power grid lines stochastic inspection system, wherein the inspection unmanned aerial vehicles are merely in charge of acquiring video images for the power gird equipment and the power transmission lines in the target power gird area, and data are processed on obtained video images by the superior unmanned aerial vehicle or the central base station, and then entering Step S2;

Step S2, acquiring, by each of the inspection unmanned aerial vehicles in the unmanned aerial vehicle group, the video images for the power gird equipment and the power transmission lines in the target power gird area based on the unmanned aerial vehicle-assisted power grid lines stochastic inspection system, and obtaining the video image data acquired and obtained by each of the inspection unmanned aerial vehicles corresponding to each time slot respectively, and then entering Step S3;

Step S3, constructing, according to the video image data acquired and obtained by each of the inspection unmanned aerial vehicles corresponding to each time slot respectively, a digital twin network of the unmanned aerial vehicle-assisted power grid lines stochastic inspection system, in combination with a weight, a signal transmission power and position coordinates of each of the inspection unmanned aerial vehicles, a weight, a signal transmission power, position coordinates, and a computing capacity of the superior unmanned aerial vehicle, position coordinates of the central base station, as well as a system communication bandwidth, to fit the position coordinates of each of the inspection unmanned aerial vehicles and the superior unmanned aerial vehicle, and a resource status of the system, and then entering Step S4;

Step S4, constructing, based on constraints of an offload latency and a data task processing latency for the power grid lines stochastic inspection system, an energy consumption model or a balanced energy consumption model of the unmanned aerial vehicle group corresponding to each time slot respectively, according to the digital twin network of the unmanned aerial vehicle-assisted power grid lines stochastic inspection system; further constructing an objective function for minimizing energy consumption of the unmanned aerial vehicle group corresponding to each time slot respectively or an objective function for minimizing balanced energy consumption of the unmanned aerial vehicle group corresponding to each time slot respectively, and entering Step S5;

Step S5, randomly initializing the position coordinates of the superior unmanned aerial vehicle, constructing, based on the position coordinates and the video image data of each of the inspection unmanned aerial vehicles corresponding to a t-th time slot respectively, a system status at the t-th time slot, and then entering Step S6;

Step S6, solving, by adopting a deep deterministic policy gradient algorithm in a deep reinforcement learning, the energy consumption model of the unmanned aerial vehicle group corresponding to each time slot respectively, based on the position coordinates of the superior unmanned aerial vehicle and the system status at the t-th time slot, according to the objective function for minimizing energy consumption of the unmanned aerial vehicle group corresponding to each time slot or the objective function for minimizing balanced energy consumption of the unmanned aerial vehicle group corresponding to each time slot respectively; obtaining, an action space of the system at the t-th time slot corresponding to the system status at the t-th time slot in combination with the position coordinates of the superior unmanned aerial vehicle, that is, the action space of the system at the t-th time slot corresponding to the system status at the t-th time slot in combination with the position coordinates of the superior unmanned aerial vehicle, wherein the action space of the system at the t-th time slot is composed of the signal transmission power of each of the inspection unmanned aerial vehicles corresponding to the t-th time slot respectively, an offload mode of each of the inspection unmanned aerial vehicles corresponding to the t-th time slot respectively regarding the superior unmanned aerial vehicle or the central base station, and the signal transmission power and an allocated CPU calculation frequency of the superior unmanned aerial vehicle corresponding to the t-th time slot, and then entering Step S7;

Step S7, determining whether an iteration overflow condition is satisfied or not, if yes, entering Step S8, if no, solving and updating, by using a genetic algorithm, the position coordinates of the superior unmanned aerial vehicle, based on the system status at the t-th time slot, in combination with system resource allocations and offload decision schemes for the video image data in the action space of the system at the t-th time slot corresponding to the position coordinates of the superior unmanned aerial vehicle, and returning to Step S6; and Step S8, processing, according to the position coordinates of the superior unmanned aerial vehicle, and the system resource allocations and the offload decision schemes for the video image data in the action space of the corresponding system at the t-th time slot, the video image acquired by each of the inspection unmanned aerial vehicles corresponding to each time slot in Step S2, to offload the video image data to the superior unmanned aerial vehicle or the central base station for processing.

2. The method for the stochastic inspections on the power grid lines based on the unmanned aerial vehicle-assisted edge computing according to claim 1, wherein Step S1 includes following Step S11 to Step S13:

Step S11, obtaining, based on a constant motion status of each of the inspection unmanned aerial vehicles within each time slot, a moving speed $v_m(t)$, a horizontal moving direction $\alpha_m(t)$, and a vertical moving direction $\beta_m(t)$ of a m-th inspection unmanned aerial vehicle corresponding to the t-th time slot for each of the inspection unmanned aerial vehicles respectively, according to following formulas:

$$v_m(t)=\lambda_1 v_m(t-1)+(1-\lambda_1)\bar{v}+\sqrt{1-\lambda_1^2}\phi_m$$

$$\alpha_m(t)=\lambda_2 \alpha_m(t-1)+(1-\lambda_2)\overline{\alpha_m}+\sqrt{1-\lambda_2^2}\psi_m$$

$$\beta_m(t)=\lambda_3 \beta_m(t-1)+(1-\lambda_3)\overline{\beta_m}+\sqrt{1-\lambda_3^2}\varphi_m,$$

where $1 \leq m \leq M$, $\bar{v}$ represents an average moving speed of all inspection unmanned aerial vehicles, $\overline{\alpha_m}$ represents an average horizontal moving angle of the m-th inspection unmanned aerial vehicle corresponding to previous t−1 time slot, $\overline{\beta_m}$ represents an average vertical moving angle of the m-th inspection unmanned aerial vehicle corresponding to the previous t−1 time slot, $v_m(t-1)$, $\alpha_m(t-1)$ and $\beta_m(t-1)$ sequentially represent a moving speed, a horizontal moving direction, and a vertical moving direction of the m-th inspection unmanned aerial vehicle corresponding to the previous t−1 time slot, $0<\lambda_1<1$, $\lambda_1$ represents a preset parameter used to adjust impacts of the moving speed of the inspection unmanned aerial vehicles corresponding to the previous t−1 time slot on a moving speed of the inspection unmanned aerial vehicles corresponding to the t-th time slot; $0<\lambda_2<1$, $\lambda_2$ represents a preset parameter used to adjust impacts of the horizontal moving direction of the inspection unmanned aerial vehicles corresponding to the previous t−1 time slot on a horizontal moving direction of the inspection unmanned aerial vehicles corresponding to the t-th time slot; $0<\lambda_3<1$, $\lambda_3$ represents a preset parameter used to adjust impacts of the vertical moving direction of the inspection unmanned aerial vehicles corresponding to the previous t−1 time slot on a vertical moving direction of the inspection unmanned aerial vehicles corresponding to the t-th time slot; a preset parameter $\phi_m$ that follows an independent gaussian distribution represents a randomness of the moving speed of the m-th inspection unmanned aerial vehicle, a preset parameter $\psi_m$ that follows an independent gaussian distribution represents a randomness of the horizontal moving direction of the m-th inspection unmanned aerial vehicle, and a preset parameter $\varphi_m$ that follows an independent gaussian distribution represents a randomness of the vertical moving direction of the m-th inspection unmanned aerial vehicle, and then entering Step S12;

Step S12, obtaining, according to a length $\tau$ of each time slot, the position coordinates $L_m^{UAV}(t)=(x_m(t),y_m(t),h_m(t))$ of the m-th inspection unmanned aerial vehicle corresponding to the t-th time slot, for each of the inspection unmanned aerial vehicles respectively according to following formulas:

$$x_m(t)=x_m(t-1)+v_m(t-1)\cos(\alpha_m(t-1))\tau$$

$$y_m(t)=y_m(t-1)+v_m(t-1)\sin(\alpha_m(t-1))\tau$$

$$h_m(t)=h_m(t-1)+v_m(t-1)\sin(\beta_m(t-1))\tau$$

where $x_m(t)$, $y_m(t)$, $h_m(t)$ represent values for the m-th inspection unmanned aerial vehicle respectively on coordinate axes x, y, z corresponding to the t-th time slot, $x_m(t-1)$, $y_m(t-1)$, $h_m(t-1)$ represent values for the m-th inspection unmanned aerial vehicle respectively on coordinate axes x, y, z corresponding to the t−1-th time slot, and then entering Step S13; and Step S13, constructing, according to the moving speed, the horizontal moving direction, the vertical moving direction and the position coordinates of each of the inspection unmanned aerial vehicles respectively corresponding to the t-th time slot, the unmanned aerial vehicle-assisted power grid lines stochastic inspection system, wherein the inspection unmanned aerial vehicles are merely in charge of acquiring video images for the power gird equipment and the power transmission lines in the target power gird area, and data are processed on the obtained video images by the superior unmanned aerial vehicle or the central base station, and then entering Step S2.

3. The method for the stochastic inspections on the power grid lines based on the unmanned aerial vehicle-assisted edge computing according to claim 1, wherein Step S3 includes following Step S31 to Step S33:

Step S31, constructing, in combination with the weight of each of the inspection unmanned aerial vehicles, the video image data acquired by each of the inspection unmanned aerial vehicles respectively corresponding to each time slot, the signal transmission power of each of the inspection unmanned aerial vehicles, the weight of the superior unmanned aerial vehicle, the CPU calculation frequency allocated to each of the inspection unmanned aerial vehicles respectively corresponding to each time slot, and the signal transmission power of the superior unmanned aerial vehicle, and the position coordinates of the central base station, a real physical entity network, according to the unmanned aerial vehicle-assisted power grid lines stochastic inspection system, and then entering Step S32;

Step S32, constructing, based on the real physical entity network, a digital twin model of each of the inspection unmanned aerial vehicles respectively corresponding to each time slot, according to a following formula:

$$DT_m^{UAV}(t)=\{W_m^{UAV},D_m^{UAV}(t),P_m^{UAV}(t),L_m^{UAV}(t),P_{max}^{UAV}\}$$

where $DT_m^{UAV}(t)$ represents a digital twin model of the m-th inspection unmanned aerial vehicle corresponding to the t-th time slot, $W_m^{UAV}$ represents a weight of the m-th inspection unmanned aerial vehicle, $D_m^{UAV}(t)$ represents video image data acquired by the m-th inspection unmanned aerial vehicle corresponding to the t-th time slot, $P_m^{UAV}(t)$ represents a signal transmission power of the m-th inspection unmanned aerial vehicle corresponding to the t-th time slot, $L_m^{UAV}(t)$ represents position coordinates of the m-th inspection unmanned aerial vehicle corresponding to the t-th time slot, and $P_{max}^{UAV}$ represents a maximum signal transmission power of the m-th inspection unmanned aerial vehicle corresponding to the t-th time slot;

at the same time, constructing a digital twin model of the superior unmanned aerial vehicle corresponding to each time slot according to a following formula:

$$DT^{SUAV}(t)=\{W^{SUAV},f^{SUAV}(t),P^{SUAV}(t),L^{SUAV}(t),P_{max}^{SUAV},f_{max}^{SUAV},C^{SUAV}\}$$

where $DT^{SUAV}(t)$ represents a digital twin model of the superior unmanned aerial vehicle corresponding to the t-th time slot, $W^{SUAV}$ represents a weight of the superior unmanned aerial vehicle, $f^{SUAV}(t)$ represents a CPU calculation frequency allocated to the superior unmanned aerial vehicle corresponding to the t-th time slot, $P^{SUAV}(t)$ represents a signal transmission power of the superior unmanned aerial vehicle corresponding to the t-th time slot, $L^{SUAV}(t)$ represents position coordinates of the superior unmanned aerial vehicle corresponding to the t-th time slot, $P_{max}^{SUAV}$ represents a maximum signal transmission power of the superior unmanned aerial vehicle corresponding to the t-th time slot, $f_{max}^{SUAV}$ represents a maximum CPU calculation frequency of the superior unmanned aerial vehicle, and $C^{SUAV}$ represents a number of CPU cycles required to process data for 1-bit by the superior unmanned aerial vehicle; and constructing a digital twin model $DT^{BS}$ of the central base station according to a following formula:

$$DT^{BS}=\{L^{BS}\}$$

where $L^{BS}$ represents the position coordinates of the central base station, and then entering Step S33; and Step S33, constructing, based on the digital twin model of each of the inspection unmanned aerial vehicles respectively corresponding to each time slot, the digital twin model of the superior unmanned aerial vehicle respectively corresponding to each time slot, and the digital twin model of the central base station, the digital twin network of the unmanned aerial vehicle-assisted power grid lines stochastic inspection system, to fit the position coordinates of each of the inspection unmanned aerial vehicles and the superior unmanned aerial vehicle, and the resource status of the system, and then entering Step S4.

4. The method for the stochastic inspections on the power grid lines based on the unmanned aerial vehicle-assisted edge computing according to claim 3, wherein Step S4 includes following Step S41 to Step S42:

Step S41, constructing, according to the digital twin network of the unmanned aerial vehicle-assisted power grid lines stochastic inspection system, a general latency model of the video image data acquired by each of the inspection unmanned aerial vehicles at each time slot corresponding to each offload type respectively, and then entering Step S42; and Step S42, constructing, based on the constraints of the offload latency and the data task processing latency for the power grid lines stochastic inspection system, the energy consumption model or the balanced energy consumption model of the unmanned aerial vehicle group corresponding to each time slot respectively, according to the general latency model of the video image data acquired by each of the inspection unmanned aerial vehicles at each time slot corresponding to each offload type respectively; further constructing the objective function for minimizing energy consumption of the unmanned aerial vehicle group respectively corresponding to each time slot, and then entering Step S5.

5. The method for the stochastic inspections on the power grid lines based on the unmanned aerial vehicle-assisted edge computing according to claim 4, wherein Step S41 includes following Step S411 to Step S413:

Step S411, constructing, based on a fact that the inspection unmanned aerial vehicles are merely capable of choosing one between the superior unmanned aerial vehicle and the central base station to offload the video image data within one time slot, a communication latency model $transT_{m,SUAV}^{SUAV}(t)$ between each of the inspection unmanned aerial vehicles and the superior unmanned aerial vehicle corresponding to each time slot, according to a fact that the inspection unmanned aerial vehicles shares a common frequency spectrum to communicate with the superior unmanned aerial vehicle, that a data transmission rate between each of the inspection unmanned aerial vehicles and the superior unmanned aerial vehicle corresponding to the t-th time slot is $R_m^{UAV}(t)$, and that a data transmission rate between the superior unmanned aerial vehicle and the central base station corresponding to the t-th time slot is $R^{SUAV}(t)$, in accordance with a following formula:

$$transT_{m,SUAV}^{UAV}(t) = \frac{D_m^{UAV}(t)}{R_m^{UAV}(t)},$$

where $transT_{m,SUAV}^{UAV}(t)$ represents a communication latency between the m-th inspection unmanned aerial vehicle and the superior unmanned aerial vehicle corresponding to the t-th time slot, and $D_m^{UAV}(t)$ represents the video image data acquired by the m-th inspection unmanned aerial vehicles corresponding to the t-th time slot; and constructing a communication latency model $transT_{m,BS}^{SUAV}(t)$ of the video image data acquired by each of the inspection unmanned aerial vehicles corresponding to each time slot respectively transmitted between the superior unmanned aerial vehicle and the central base station, according to a following formula:

$$transT_{m,BS}^{SUAV}(t) = \frac{D_m^{UAV}(t)}{R^{SUAV}(t)},$$

where $transT_{m,BS}^{SUAV}(t)$ represents a communication latency of the video image data acquired by the m-th inspection unmanned aerial vehicle corresponding to the t-th time slot transmitted between the superior unmanned aerial vehicle and the central base station; and then entering Step S412;

Step S412, constructing, based on a fact that the video image data acquired by the m-th inspection unmanned aerial vehicle at the t-th time slot corresponding to a definition $a_m^{UAV}(t)=0$ are offloaded to the superior unmanned aerial vehicle for processing, a data processing latency model $comT_m^{SUAV}(t)$ at a receiving terminal of the superior unmanned aerial vehicle for the video image data acquired by the m-th inspection unmanned aerial vehicle at the t-th time slot, according to a following formula:

$$comT_m^{SUAV}(t) = \frac{D_m^{UAV}(t)C^{SUAV}}{f^{SUAV}(t)},$$

where $C^{SUAV}$ represents the number of CPU cycles required to process data for 1-bit by the superior unmanned aerial vehicle, and $f^{SUAV}(t)$ represents the CPU calculation frequency allocated to the superior unmanned aerial vehicle corresponding to the t-th time slot; and constructing, based on a fact that the superior unmanned aerial vehicle processes the video images in a non-preemptive mode in accordance with a channel power gain descending mode, a queue waiting latency model $queT_m^{SUAV}$ for the video image data acquired by the m-th inspection unmanned aerial vehicle at the t-th time slot before being processed by the superior unmanned aerial vehicle, according to a following formula:

$$queT_m^{SUAV} = \sum_{i=1,\rho(k)m}^{k-1} \left(1 - a_{\rho(i)}^{UAV}(t)\right) comT_{\rho(i)}^{SUAV}(t),$$

where $\rho(i)$ represents a sequence number of the inspection unmanned aerial vehicles from which the superior unmanned aerial vehicle sequentially processes i-th video image data, and k represents a sequence number of the video image data acquired by the m-th inspection unmanned aerial vehicle at the t-th time slot waiting to be processed by the superior unmanned aerial vehicle; and then constructing a general latency model $T_{m,0}(t)$ corresponding to offloading the video image data acquired by the m-th inspection unmanned aerial vehicle at the t-th time slot to the superior unmanned aerial vehicle for processing according to a following formula:

$$T_{m,0}(t) = transT_{m,SUAV}^{UAV}(t) + comT_m^{SUAV}(t) + queT_m^{SUAV},$$

and then entering Step S413; and

Step S413, constructing, based on a fact that the video image data acquired by the m-th inspection unmanned aerial vehicle at the t-th time slot corresponding to a definition $d_m^{UAV}(t)=1$ are offloaded to the superior unmanned aerial vehicle for processing, a general latency model $T_{m,1}(t)$ corresponding to offloading the video image data acquired by the m-th inspection unmanned aerial vehicle at the t-th time slot to the central base station for processing, according to a following formula:

$$T_{m,1}(t) = \text{trans}T_{m,BS}^{SUAV}(t) + \text{que}T_m^{SUAV},$$

and then entering step S42.

6. The method for the stochastic inspections on the power grid lines based on the unmanned aerial vehicle-assisted edge computing according to claim 5, wherein each of the inspection unmanned aerial vehicles is respectively communicated with the superior unmanned aerial vehicle by adopting a non orthogonal multiple access mode, and the superior unmanned aerial vehicle is communicated with the central base station by adopting an orthogonal frequency division multiple access mode.

7. The method for the stochastic inspections on the power grid lines based on the unmanned aerial vehicle-assisted edge computing according to claim 5, wherein Step S42 includes Step S421 to Step S422:

Step S421, constructing, by a wired power supply mode, an energy consumption model $E^{all}(t)$ of the unmanned aerial vehicle group corresponding to the t-th time slot, based on the central base station according to a following formula:

$$E^{all}(t) = \sum_{m=1}^{M} \left[ flyE_m^{UAV}(t) + transE_{m,SUAV}^{UAV}(t) + (1 - a_m^{UAV}(t))comE_m^{SUAV}(t) + a_m^{UAV}(t)(2 - a_m^{UAV}(t))transE_{m,BS}^{SUAV}(t) \right] + flyE^{SUAV}(t)$$

where $$flyE_m^{UAV}(t) = \frac{W_m^{UAV}}{2\tau} \| L_m^{UAV}(t) - L_m^{UAV}(t-1) \|^2,$$

$flyE^{SUAV}(t)$ represents a flight energy consumption of the m-th inspection unmanned aerial vehicle at the t-th time slot;

$$flyE^{SUAV}(t) = \frac{W^{SUAV}}{2\tau} \| L^{SUAV}(t) - L^{SUAV}(t-1) \|^2,$$

$flyE^{SUAV}(t)$ represents a flight energy consumption of the superior unmanned aerial vehicle at the t-th time slot; $comE_m^{SUAV}(t) = \kappa^{SUAV} f^{SUAV}(t)^2 C^{SUAV} D_m^{SUAV}(t)$, $comE_m^{SUAV}(t)$ represents an energy consumed by offloading the video image data acquired by the m-th inspection unmanned aerial vehicle at the t-th time slot to the superior unmanned aerial vehicle for processing, $\kappa^{SUAV}$ represents an effective switched capacitor corresponding to a CPU of the superior unmanned aerial vehicle; $transE_{m,SUAV}^{UAV}(t) = transT_{m,SUAV}^{UAV}(t) P_m^{UAV}(t)$, $transE_{m,SUAV}^{UAV}(t)$ represents an transmission energy consumption of transmitting the video image data $D_m^{UAV}(t)$ acquired by the m-th inspection unmanned aerial vehicle at the t-th time slot with the superior unmanned aerial vehicle; $transE_{m,BS}^{SUAV}(t) = transT_{m,BS}^{SUAV}(t) P^{SUAV}(t)$, and $transE_{m,BS}^{SUAV}(t)$ represents an transmission energy consumption of data $D_m^{UAV}(t)$ between the superior unmanned aerial vehicle and the central base station, and then entering Step S422;

Step S422, further constructing, based on an energy consumption model $E^{all}(t)$ of the unmanned aerial vehicle group corresponding to the t-th time slot, an objective function $$\min_{\substack{P_m^{UAV}(t), P^{SUAV}(t) \\ L^{SUAV}(t), a_m^{UAV}(t) \\ f^{SUAV}(t)}} E^{all}(t)$$

for minimizing energy consumption of the unmanned aerial vehicle group corresponding to each time slot, according to following formulas:

$$\min_{\substack{P_m^{UAV}(t), P^{SUAV}(t) \\ L^{SUAV}(t), a_m^{UAV}(t) \\ f^{SUAV}(t)}} E^{all}(t)$$

s.t. $C1$: $a_m^{UAV}(t) = \{0, 1\}$, $\forall m \in M$ $C2$: $0 < P_m^{UAV}(t) \leq P_{max}^{UAV}$, $\forall m \in M$ $C3$: $0 < P^{SUAV}(t) \leq P_{max}^{SUAV}$ $C4$: $0 < f^{SUAV}(t) \leq f_{max}^{SUAV}$ $C5$: $x_{min} \leq x(t) < x_{max}$ $C6$: $y_{min} \leq y(t) < y_{max}$ $C7$: $h_{min} \leq h(t) < h_{max}$ $C8$: $R_m^{UAV}(t) \geq R^{SUAV}(t)$, $\forall m \in M$ $C9$: $(1 - a_m^{UAV}(t))T_{m,0}(t) + a_m^{UAV}(t)(2 - a_m^{UAV}(t))T_{m,1}(t) \leq \tau$, $\forall m \in M$, where C5 to C7 represent preset motion ranges for constraining the superior unmanned aerial vehicle, C8 represents a conditional requirement for a full-duplex communication of the superior unmanned aerial vehicle, and C9 represents that the video image data $D_m^{UAV}(t)$ acquired by the m-th inspection unmanned aerial vehicle at the t-th time slot needs to be offloaded within the time slot.

8. The method for the stochastic inspections on the power grid lines based on the unmanned aerial vehicle-assisted edge computing according to claim 5, wherein Step S42 includes Step S421' to Step S422':

Step S421', constructing, by a wired power supply mode, a balanced energy consumption model $E_{even}^{all}(t)$ of the unmanned aerial vehicle group corresponding to the t-th time slot, based on the central base station according to a following formula:

$$E_{even}^{all}(t) = \sum_{m=1}^{M} \left[ flyE_m^{UAV}(t) + transE_{m,SUAV}^{UAV}(t) + (1 - a_m^{UAV}(t))comE_m^{SUAV}(t) + a_m^{UAV}(t)(2 - a_m^{UAV}(t))transE_{m,BS}^{SUAV}(t) \right] +$$

-continued $$flyE^{SUAV}(t) + \chi \sum_{m=1}^{M} \sum_{m'=1, m \neq m'}^{M} \left| \left( flyE_m^{UAV}(t) + transE_{m,SUAV}^{UAV}(t) \right) - \left( flyE_{m'}^{UAV}(t) + transE_{m',SUAV}^{UAV}(t) \right) \right|$$

where $\chi$ represents a balanced energy consumption coefficient, $$flyE_m^{UAV}(t) = \frac{W_m^{UAV}}{2\tau} \left\| L_m^{UAV}(t) - L_m^{UAV}(t-1) \right\|^2,$$

$flyA_m^{UAV}(t)$ represents a flight energy consumption of the m-th inspection unmanned aerial vehicle at the t-th time slot;

$$flyE^{SUAV}(t) = \frac{W^{SUAV}}{2\tau} \left\| L^{SUAV}(t) - L^{SUAV}(t-1) \right\|^2,$$

$flyE^{SUAV}(t)$ represents a flight energy consumption of the superior unmanned aerial vehicle at the t-th time slot; $comE_m^{SUAV}(t) = \kappa^{SUAV} f^{SV}(t)^2 C^{SUAV} D_m^{UAV}(t)$, $comE_m^{SUAV}(t)$ represents an energy consumed by offloading the video image data $D_m^{UAV}(t)$ acquired by the m-th inspection unmanned aerial vehicle at the t-th time slot to the superior unmanned aerial vehicle for processing, $\kappa^{SUAV}$ represents an effective switched capacitor corresponding to a CPU of the superior unmanned aerial vehicle; $transE_{m,SUAV}^{UAV}(t) = transT_{m,SUAV}^{UAV}(t) P_m^{UAV}(t)$, $transE_{m,SUAV}^{UAV}(t)$ represents a transmission energy consumption of transmitting the video image data $D_m^{UAV}(t)$ acquired by the m-th inspection unmanned aerial vehicle at the t-th time slot with the superior unmanned aerial vehicle; $transE_{m,BS}^{SUAV}(t) = transT_{m,BS}^{SUAV}(t) P^{SUAV}(t)$, and $transE_{m,BS}^{SUAV}(t)$ represents a transmission energy consumption of data $D_m^{UAV}(t)$ between the superior unmanned aerial vehicle and the central base station, and then entering Step S422'; and Step S422', further constructing, based on a balanced energy consumption model $E_{even}^{all}(t)$ of the unmanned aerial vehicle group corresponding to the t-th time slot, an objective function $$\min_{\substack{P_m^{UAV}(t), P^{SUAV}(t) \\ L^{SUAV}(t), a_m^{UAV}(t) \\ f^{SUAV}(t)}} E_{even}^{all}(t)$$

for minimizing energy consumption of the unmanned aerial vehicle group corresponding to each time slot, according to following formulas:

$$\min_{\substack{P_m^{UAV}(t), P^{SUAV}(t) \\ L^{SUAV}(t), a_m^{UAV}(t) \\ f^{SUAV}(t)}} E_{even}^{all}(t)$$

s.t. C1: $a_m^{UAV}(t) = \{0, 1\}, \forall m \in M$

C2: $0 < P_m^{UAV}(t) \leq P_{max}^{UAV}, \forall m \in M$

C3: $0 < P^{SUAV}(t) \leq P_{max}^{SUAV}$

C4: $0 < f^{SUAV}(t) \leq f_{max}^{SUAV}$

C5: $x_{min} \leq x(t) < x_{max}$

C6: $y_{min} \leq y(t) < y_{max}$

C7: $h_{min} \leq h(t) < h_{max}$

C8: $R_m^{UAV}(t) \geq R^{SUAV}(t), \forall m \in M$

C9: $\left(1 - a_m^{UAV}(t)\right) T_{m,0}(t) + a_m^{UAV}(t)\left(2 - a_m^{UAV}(t)\right) T_{m,1}(t) \leq \tau, \forall m \in M$, where C5 to C7 represent preset motion ranges for constraining the superior unmanned aerial vehicle, C8 represents a conditional requirement for a full-duplex communication of the superior unmanned aerial vehicle, and C9 represents that the video image data $D_m^{UAV}(t)$ acquired by the m-th inspection unmanned aerial vehicle at the t-th time slot needs to be offloaded within the time slot.

9. The method for the stochastic inspections on the power grid lines based on the unmanned aerial vehicle-assisted edge computing according to claim 7, wherein in Step S7, following Step S71 to Step S73 are performed, if an iteration overflow condition is not satisfied;

Step S71, randomly initializing a population K(t) at the t-th time slot, K(t)={$L_1^{SUAV}(t), L_2^{SUAV}(t), \ldots, L_i^{SUAV}(t), \ldots, L_I^{SUAV}(t)$}, where $1 \leq i \leq I$, I represents a number of individuals in the population K(t) at the t-th time slot, and $L_i^{SUAV}(t)$ represents i-th position coordinates of the superior unmanned aerial vehicle in the population (t) at the t-th time slot, and then entering Step S72;

Step S72, obtaining, based on the system status at the t-th time slot, a fitness respectively corresponding to each of the individuals in the population K(t) at the t-th time slot for each of the individuals in the population K(t) at the t-th time slot respectively, in combination with system resource allocations and offload decision schemes for the video image data in the action space of the system at the t-th time slot corresponding to the position coordinates of the superior unmanned aerial vehicle, according to a following formula:

$$\text{Fit}(t)\bigg|_{L_i^{SUAV}(t)} = \frac{1}{1 + E_{even}^{all}(t)\bigg|_{L_i^{SUAV}(t)}},$$

and then entering Step S73; and

Step S73, determining, whether the fitness corresponding to each of the individuals in the population K(t) at the t-th time slot satisfies a preset fitness threshold or not, if yes, selecting an individual corresponding to a highest fitness, that is, obtaining position coordinates of the superior unmanned aerial vehicle corresponding to the individual and updating the position coordinates of the superior unmanned aerial vehicle, and then returning to Step S6; if no, selecting, crossing, and mutating, based on the fitness of each of the individuals in the population K(t) at the t-th time slot, data in the population K(t) at the t-th time slot, updating each of the individuals in the population K(t) at the t-th time slot, and then returning to Step S72.

10. The method for the stochastic inspections on the power grid lines based on the unmanned aerial vehicle-assisted edge computing according to claim 9, wherein in Step S73, the preset fitness threshold is a lower limit of the preset fitness, whether the fitness corresponding to each of the individuals respectively in the population K(t) at the t-th time slot is greater than the lower limit of the preset fitness or not is determined, when the preset fitness threshold is the lower limit of the preset fitness.

11. The method for the stochastic inspections on the power grid lines based on the unmanned aerial vehicle-assisted edge computing according to claim 1, wherein the iteration overflow condition in Step S7 is that a maximum preset iteration number, or a variance of the energy consumption of the unmanned aerial vehicle group corresponding to the t-th time slot in each iteration within a preset iteration number starting from a current iteration direction towards a historical iteration direction, is less than a preset range of energy consumption fluctuations.

\* \* \* \* \*